(12) United States Patent
Buehler

(10) Patent No.: US 7,825,792 B2
(45) Date of Patent: Nov. 2, 2010

(54) SYSTEMS AND METHODS FOR DISTRIBUTED MONITORING OF REMOTE SITES

(75) Inventor: Christopher J. Buehler, Cambridge, MA (US)

(73) Assignee: Sensormatic Electronics LLC, Boca Raton, FL (US)

( * ) Notice: Subject to any disclaimer, the term of this patent is extended or adjusted under 35 U.S.C. 154(b) by 1188 days.

(21) Appl. No.: 11/446,570

(22) Filed: Jun. 2, 2006

(65) Prior Publication Data

US 2007/0283004 A1 Dec. 6, 2007

(51) Int. Cl.
G08B 29/00 (2006.01)
(52) U.S. Cl. .................. 340/506; 340/540; 340/541
(58) Field of Classification Search ............... 340/506, 340/541, 540; 705/1, 7, 10
See application file for complete search history.

(56) References Cited

U.S. PATENT DOCUMENTS

| | | | |
|---|---|---|---|
| 3,740,466 A | 6/1973 | Marshall et al. ............ 178/6.8 |
| 4,511,886 A | 4/1985 | Rodriguez ................. 340/534 |
| 4,737,847 A | 4/1988 | Araki et al. ................ 358/108 |
| 5,097,328 A | 3/1992 | Boyette ..................... 358/108 |
| 5,164,827 A | 11/1992 | Paff ......................... 358/108 |
| 5,179,441 A | 1/1993 | Anderson et al. ............ 358/88 |
| 5,216,502 A | 6/1993 | Katz ........................ 358/108 |
| 5,237,408 A | 8/1993 | Blum et al. ................. 358/108 |
| 5,243,418 A | 9/1993 | Kuno et al. ................ 358/108 |
| 5,298,697 A | 3/1994 | Suzuki et al. .............. 187/131 |
| 5,305,390 A | 4/1994 | Frey et al. ................... 382/2 |
| 5,317,394 A | 5/1994 | Hale et al. ................. 348/208 |
| 5,581,625 A | 12/1996 | Connell ...................... 382/1 |
| 5,666,157 A | 9/1997 | Aviv ........................ 348/152 |
| 5,699,444 A | 12/1997 | Palm ........................ 382/106 |
| 5,729,471 A | 3/1998 | Jain et al. ................. 364/514 |
| 5,734,737 A | 3/1998 | Chang et al. ............... 382/107 |
| 5,745,126 A | 4/1998 | Jain et al. ................. 345/952 |
| 5,920,338 A | 7/1999 | Katz ........................ 348/150 |
| 5,956,081 A | 9/1999 | Katz et al. ................ 348/163 |
| 5,969,755 A | 10/1999 | Courtney ................... 348/143 |
| 5,973,732 A | 10/1999 | Guthrie .................... 348/169 |
| 6,002,995 A | 12/1999 | Suzuki et al. .............. 702/188 |
| 6,028,626 A | 2/2000 | Aviv ........................ 348/152 |
| 6,049,363 A | 4/2000 | Courtney et al. ............ 348/700 |
| 6,061,088 A | 5/2000 | Khosravi et al. ........... 348/169 |
| 6,069,655 A | 5/2000 | Seeley et al. .............. 348/154 |
| 6,075,560 A | 6/2000 | Katz ........................ 348/150 |
| 6,097,429 A | 8/2000 | Seeley et al. .............. 348/154 |

(Continued)

FOREIGN PATENT DOCUMENTS

EP  0 529 317   3/1993

(Continued)

OTHER PUBLICATIONS

Chang et al., "Tracking Multiple People with a Multi-Camera System," *IEEE*, 19-26 (2001).

(Continued)

*Primary Examiner*—Toan N Pham
(74) *Attorney, Agent, or Firm*—Goodwin Procter LLP

(57) ABSTRACT

Templates are used to define generic site layouts in terms of site-independent elements. The templates are customized by site-knowledgeable users and employed within a surveillance system.

18 Claims, 13 Drawing Sheets

U.S. PATENT DOCUMENTS

| | | |
|---|---|---|
| 6,185,314 B1 | 2/2001 | Crabtree et al. ............. 382/103 |
| 6,188,777 B1 | 2/2001 | Darrell et al. ............... 382/103 |
| 6,237,647 B1 | 5/2001 | Pong et al. .................... 141/94 |
| 6,285,746 B1 | 9/2001 | Duran et al. ............. 379/93.21 |
| 6,295,367 B1 | 9/2001 | Crabtree et al. ............ 382/103 |
| 6,359,647 B1 | 3/2002 | Sengupta et al. ............ 348/154 |
| 6,396,535 B1 | 5/2002 | Waters ....................... 348/159 |
| 6,400,830 B1 | 6/2002 | Christian et al. ............ 382/103 |
| 6,400,831 B2 | 6/2002 | Lee et al. .................... 382/103 |
| 6,437,819 B1 | 8/2002 | Loveland .................... 348/143 |
| 6,442,476 B1 | 8/2002 | Poropat ....................... 701/207 |
| 6,456,320 B2 | 9/2002 | Kuwano et al. ............. 348/143 |
| 6,456,730 B1 | 9/2002 | Taniguchi ................... 382/107 |
| 6,483,935 B1 | 11/2002 | Rostami et al. ............. 382/141 |
| 6,502,082 B1 | 12/2002 | Toyama et al. ................ 706/16 |
| 6,516,090 B1 | 2/2003 | Lennon et al. .............. 382/173 |
| 6,522,787 B1 | 2/2003 | Kumar et al. ............... 382/268 |
| 6,526,156 B1 | 2/2003 | Black et al. ................. 382/103 |
| 6,549,643 B1 | 4/2003 | Toklu et al. ................. 382/107 |
| 6,549,660 B1 | 4/2003 | Lipson et al. ............... 382/224 |
| 6,574,353 B1 | 6/2003 | Schoepflin et al. .......... 382/103 |
| 6,580,821 B1 | 6/2003 | Roy ........................... 382/154 |
| 6,591,005 B1 | 7/2003 | Gallagher ................... 382/154 |
| 6,698,021 B1 | 2/2004 | Amini et al. ................ 725/105 |
| 6,748,343 B2 * | 6/2004 | Alexander et al. .......... 702/188 |
| 6,791,603 B2 | 9/2004 | Lazo et al. .................. 348/169 |
| 6,798,445 B1 | 9/2004 | Brummitt et al. ....... 348/207.11 |
| 6,813,372 B2 | 11/2004 | Stanbridge et al. .......... 382/107 |
| 2001/0032118 A1 | 10/2001 | Carter ........................ 705/11 |
| 2003/0025800 A1 | 2/2003 | Hunter et al. .......... 348/208.13 |
| 2003/0040815 A1 | 2/2003 | Pavlidis ....................... 700/48 |
| 2003/0053658 A1 | 3/2003 | Pavlidis ...................... 382/103 |
| 2003/0058111 A1 | 3/2003 | Lee et al. ................. 340/573.1 |
| 2003/0058237 A1 | 3/2003 | Lee ............................ 345/418 |
| 2003/0058341 A1 | 3/2003 | Brodsky et al. ............. 348/169 |
| 2003/0058342 A1 | 3/2003 | Trajkovic ................. 348/207.1 |
| 2003/0071891 A1 | 4/2003 | Geng ........................... 348/39 |
| 2003/0103139 A1 | 6/2003 | Pretzer et al. ............... 348/143 |
| 2003/0123703 A1 | 7/2003 | Pavlidis et al. ............. 382/103 |
| 2003/0197612 A1 | 10/2003 | Tanaka et al. ............ 340/572.1 |
| 2004/0130620 A1 | 7/2004 | Buehler et al. .............. 348/143 |
| 2004/0155960 A1 | 8/2004 | Wren et al. ................. 348/150 |
| 2004/0160317 A1 | 8/2004 | McKeown et al. .......... 340/522 |
| 2004/0164858 A1 | 8/2004 | Lin ............................ 340/522 |
| 2004/0252197 A1 | 12/2004 | Fraley et al. ............. 348/207.1 |
| 2005/0017071 A1 | 1/2005 | Noonan ....................... 235/385 |
| 2005/0073418 A1 | 4/2005 | Kelliher et al. ........... 340/572.1 |
| 2005/0078006 A1 | 4/2005 | Hutchins et al. ............ 340/561 |
| 2005/0102183 A1 | 5/2005 | Kelliher et al. ................ 705/16 |

FOREIGN PATENT DOCUMENTS

| | | |
|---|---|---|
| EP | 0 714 081 | 5/1996 |
| EP | 0 967 584 | 12/1999 |
| EP | 1189187 | 3/2002 |
| JP | 8011071 | 1/1996 |
| WO | 97/04428 | 2/1997 |
| WO | 01/46923 A1 | 6/2001 |
| WO | 01/82626 | 11/2001 |
| WO | 2004/034347 A1 | 4/2004 |

OTHER PUBLICATIONS

International Search Report for International Application No. PCT/US03/35943 dated Apr. 13, 2004.

Khan et al., "Human Tracking in Multiple Cameras," *IEEE*, 331-336 (2001).

International Search Report for PCT/US04/033168 dated Feb. 25, 2005.

Written Opinion of the International Searching Authority for PCT/US04/033168.

International Search Report for PCT/US04/29418 dated Feb. 28, 2005.

Written Opinion of the International Searching Authority for PCT/US04/29418 dated Feb. 28, 2005.

International Search Report for PCT/US04/29417 dated Apr. 8, 2005.

Written Opinion of the International Searching Authority for PCT/US04/29417 dated Apr. 8, 2005.

International Search Report for PCT/US2004/033177 dated Dec. 12, 2005.

Written Opinion for PCT/US2004/033177.

Author unknown. "The Future of Security Systems" retrieved from the internet on May 24, 2005, http://www.activeye.com/; http://www.activeye.com/act_alert.htm; http://www.activeye.com/tech.htm; http://www.activeye.com/ae_team.htm; 7 pgs.

International Preliminary Report on Patentability for PCT/US2004/029417 dated Mar. 13, 2006.

International Preliminary Report on Patentability for PCT/US2004/033177 dated Apr. 10, 2006.

International Preliminary Report on Patentability for PCT/US2004/033168 dated Apr. 10, 2006.

International Search Report for PCT/US2006/021087 dated Oct. 19, 2006.

Written Opinion of the International Searching Authority dated Oct. 19, 2006.

* cited by examiner

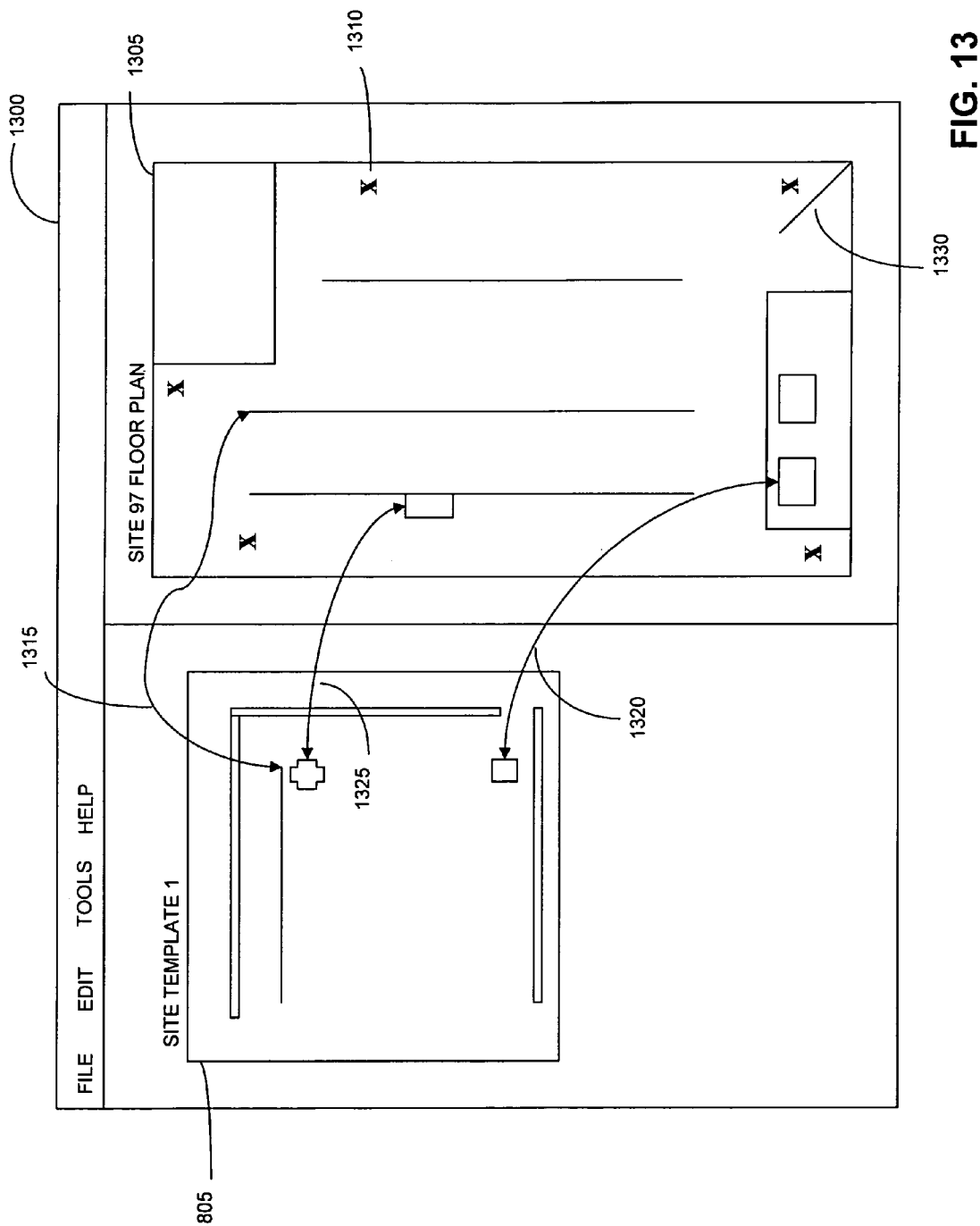

SYSTEMS AND METHODS FOR DISTRIBUTED MONITORING OF REMOTE SITES

TECHNICAL FIELD

This invention relates to computer-based methods and systems for monitoring activities, and more specifically to a computer-aided surveillance system capable of detecting events occurring at multiple sites.

BACKGROUND INFORMATION

The current heightened sense of security and declining cost of monitoring equipment have resulted in increased use of surveillance systems using technologies such as closed-circuit television (CCTV). Such systems have the potential to reduce crime, prevent accidents, and generally increase security in a wide variety of environments. Video surveillance systems typically include a series of cameras placed in various locations about an area of interest (e.g., a warehouse, a retail establishment, an office building, an airport, for example). The cameras transmit video feeds back to a central viewing stations (or multiple stations), typically manned by a security officer. The various surveillance feeds are displayed on a series of screens, which are monitored for suspicious activities.

In addition to using CCTV systems at individual locations, there is great interest in using video surveillance and analysis systems to collect data about the behavior of people across multiple locations. For example, a national retail store chain might be interested in the behavior of shoppers in its various stores. While data collected from a single site is useful, the full value of the data is only realized when comparing data from different sites, such as providing insights into how to optimally deploy resources across multiple locations at or within a site to achieve specific goals.

In order to be useful, however, the data from one location should be comparable to data collected at other similar locations. That is, the same events (e.g., "person paused in front of display") should have a consistent meaning at each location. However, because of non-standard floor-plans, variable camera configurations, and other site differences, the occurrence of an event can appear quite different (from the point-of-view of a surveillance system) at each location. Such differences make it difficult for a single person (e.g., a chief security officer or corporate marketing analyst) to specify an event at the level of detail needed in order to reliably detect the event at multiple disparate locations.

One approach to dealing with the problem of non-uniform locations is to have a global operator interact with a surveillance system at each individual site to define events of interest. While this approach has the advantage that events can be centrally controlled and managed, time and resource constraints prohibit the scalability across many sites. Another approach requires that similar locations across all sites be identical, both in floor-plan and sensor placement. Although this approach allows a global operator to centrally define events of interest and replicate the events across all locations, requiring all locations to be identical is not practical. A third approach places the responsibility of event definition in the hands of local site operators, but such an approach relinquishes any element of centralized control and significantly reduces data consistency across sites.

Unfortunately, none of these approaches is sufficient. What is needed, therefore, is a technique for centrally defining and managing events at a global level while allowing variability among location layouts and camera configurations.

SUMMARY

In accordance with the invention, rules are applied to surveillance data (e.g., video surveillance data, point-of-sale ("POS") data, radio frequency identification ("RFID") data, electronic article surveillance ("EAS") data, personnel identification data such as proximity card data and/or biometrics, etc.) to detect the occurrence (or non-occurrence) of an event. To facilitate both centralized control and localization simultaneously, event definition is separated into multiple components, with certain components being defined globally, and other components defined locally. The global components of an event can describe, for example, the aspects of the event that are identical (or nearly identical) across all (or some large set) of locations. The local components describe aspects of the event that can be customized for each location.

For example, using the systems and techniques described below, a central security authority can create an event definition "template" that includes global, concrete information about some event of interest (e.g., theft, vandalism, purchase, etc.) as well as "placeholders" for localized event information to be completed by operators at remote sites, who typically will have greater knowledge about product placement, camera placement, floor plans, etc. The template is provided to the sites and implemented as part of the site's surveillance system. The local system operator completes the template, and an acknowledgment is sent to the central authority indicating that the event has been fully defined and being used for ongoing surveillance.

Accordingly, in a first aspect, the invention provides a method for monitoring sites that includes providing a canonical site layout that specifies an element or elements that are common to some number of the sites. Events are assigned to the elements without regard to the actual layout of the sites, resulting in an annotated canonical site layout. The annotated layout is then transmitted to a user who is familiar with the site to which the layout was sent, and the user can then modify the canonical site layout (using, for example, a downloadable applet such as an AJAX applet) such that it is consistent with the actual site layout, and can be used to monitor the site.

The elements can specify locations about the sites such floor plan data. The events assigned to the canonical floor plan can be site-specific (e.g., sensor identification data such as camera IDs, RFID sensor IDs, POS sensor IDs, and/or EAS sensor IDs) and/or site independent, such as a location (exit, aisle way, etc.) or an interaction between a person and an element (e.g., a customer stopping at a product display).

In some embodiments, the modified layout can be used within a surveillance system (at one or more of the sites, for example) as a basis for generating alerts based on the occurrence of the events. The alerts can be analyzed to determine, for example, the accuracy of the events and/or floor plan.

In another aspect, the invention provides a system for monitoring sites including a user interface and a modification module. The user interface includes a canonical site layout pane in which site-independent elements are associated with the canonical site layout, and a pane in which an actual, site-specific layout is presented to the user. The modification module facilitates the association of site-independent elements with site-specific elements of the actual site layout.

In some embodiments, the modification module comprises an asynchronous java script applet. The system can also include a web server for providing the applet to users and for processing data requests from the applet, using, for example, XML. A data storage module can also be used to fulfill data requests made by modification module and submitted via the web server.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 10 is a screen capture of a user interface for defining events within a surveillance system according to one embodiment of the invention.

FIG. 11 is a screen capture of a user interface for modifying events within a surveillance system according to one embodiment of the invention.

FIG. 13 is representation of a user interface for customizing a site-specific floor plan using a floor plan template within a surveillance system according to one embodiment of the invention.

DETAILED DESCRIPTION

Although described herein with reference to tracking patrons and products within retail establishments, and as useful when implemented with regard to detecting theft and measuring various merchandising and operational aspects of stores, the systems and techniques described below are equally applicable to any environment being monitored, such as airports, casinos, schools, amusement parks, entertainment venues, and office buildings for a wide range of purposes.

Figure 1:
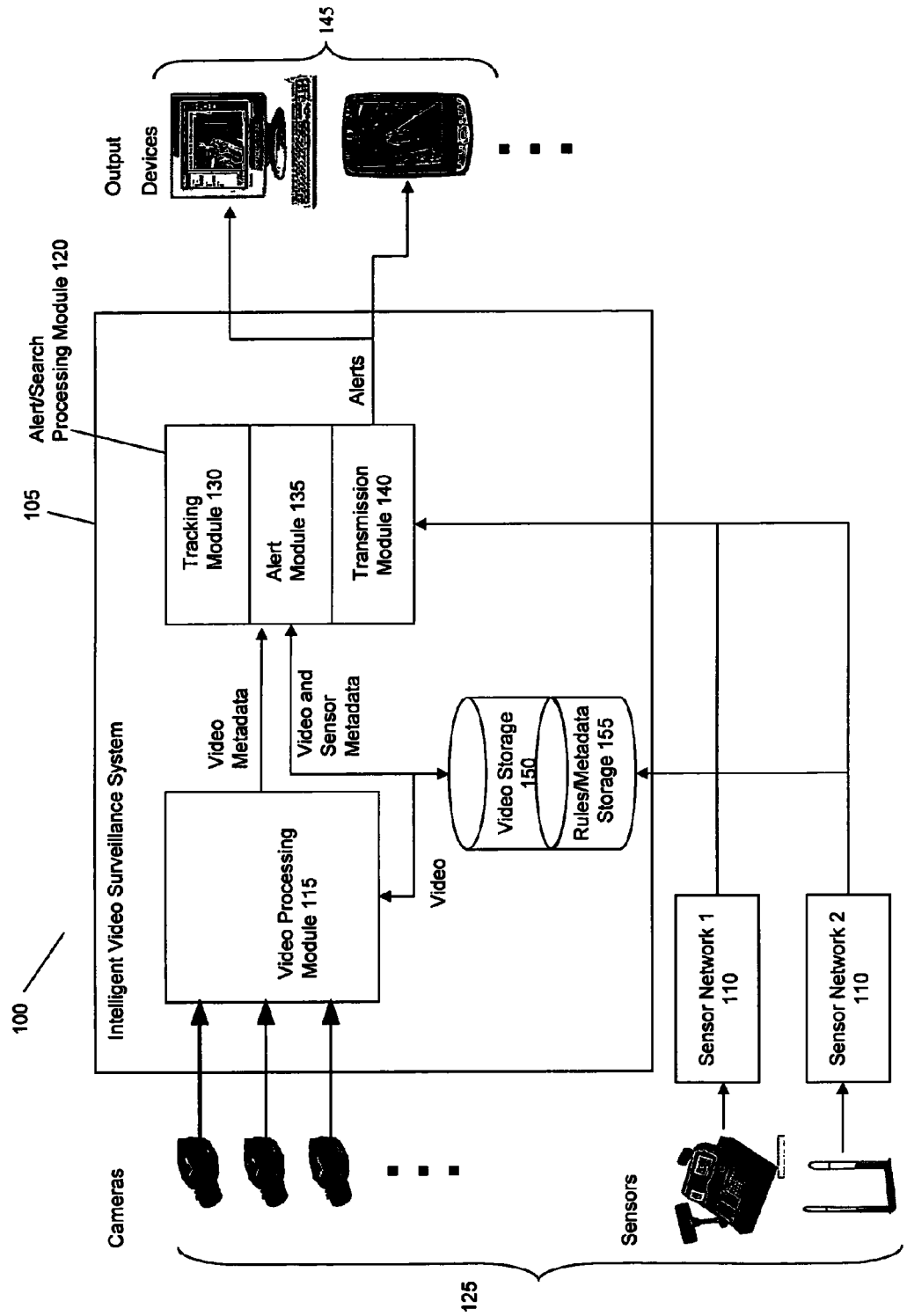
FIG. 1 is a block diagram of a surveillance system incorporating data from multiple sensor networks according to one embodiment of the invention.

FIG. 1 illustrates an integrated video surveillance and sensor network system 100 in accordance with various embodiments of the invention. The system 100 captures surveillance data from any number of monitoring devices within one or more monitored sites, the data thus being available for analysis and/or processing locally (at each monitoring device, at a local processor or both), at a single centralized location and/or at any number of intermediate data processing locations. In some embodiments, the processing and analysis techniques described below can be allocated among remote, intermediate and centralized sites according to bandwidth, processing capacities, and other parameters. Data from the monitoring devices can be processed according to one or more rules in order to detect the occurrence (or in some cases non-occurrence) of an event or events at the monitored sites. The system broadly includes an intelligent video surveillance system 105 and optionally one or more external sensor networks 110. The intelligent video surveillance system 105 includes a video processing module 115 and an alert/search processing module 120. The video processing module 115 analyzes video streams, producing compressed video and video meta-data as outputs. In some embodiments, the alert/search processing module 120 includes a tracking module 130, an alert module 135 and a transmission module 140 and scans video metadata for patterns that match a set of predefined rules, producing alerts (or search results, in the case of prerecorded metadata) when pattern matches are found which can then be transmitted to one or more output devices 145 (described in greater detail below). Examples of metadata used by the alert module when processing the rules include object IDs, object type (e.g., person, product, etc.) date/time stamps, current camera location, previous camera locations, directional data, product cost, product shrinkage, as well as others.

One example of an intelligent video surveillance system 105 is described in commonly-owned, co-pending U.S. patent application Ser. No. 10/706,850, "Method And System For Tracking And Behavioral Monitoring Of Multiple Objects Moving Through Multiple Fields-Of-View," the entire disclosure of which is included by reference herein. In certain implementations, the alert/search processing module 120 is augmented with additional inputs for receiving data from external sensor networks 110 using various forms of tracking and data capture, such as point-of-sale ("POS") systems, radio frequency identification ("RFID") systems, and/or electronic article surveillance ("EAS") systems, as described in commonly-owned, co-pending U.S. patent application Ser. No. 11/443,500, "Object Tracking and Alerts," filed on May 30, 2006, the entire disclosure of which is included by reference herein.

The video surveillance system 105 includes multiple input sensors 125 that capture data depicting the interaction of people and things in a monitored environment. The sensors 125 can include both cameras (e.g., optical sensors, infrared detectors, still cameras, analog video cameras, digital video cameras, or any device that can generate image data of sufficient quality to support the methods described below) and non-video based sensors (e.g., RFID base stations, POS scanners and inventory control systems). The sensors can also include smoke, fire and carbon monoxide detectors, door and window access detectors, glass break detectors, motion detectors, audio detectors, infrared detectors, computer network monitors, voice identification devices, video cameras, still cameras, microphones and/or fingerprint, facial, retinal, or other biometric identification devices. In some instances, the sensors can include conventional panic buttons, global positioning satellite (GPS) locators, other geographic locators, medical indicators, and vehicle information systems. The sensors can also be integrated with other existing information systems, such as inventory control systems, accounting systems, or the like.

In instances in which additional external sensor networks 110 are implemented in conjunction with the video surveillance system 105, external sensor networks 110 collect and route signals representing the sensor outputs to the alert/search processing module 120 of the video surveillance system 105 via one or more standard data transmission techniques. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways such as Ethernet or wireless networks, direct serial or parallel connections, USB, firewire, Bluetooth, or proprietary interfaces. The system 100 can be configured as a "star-shaped network" in which each sensor 125 is individually connected to the alert/search module 120, or in some cases, the sensor network 110 may have a more generic topology including switches, routers, and other components commonly found in computer networks. In some embodiments, the sensors 125 are capable of two-way communication, and thus can receive signals (to power up, sound an alert, move, change settings, etc.) from the video surveillance system 105.

In some embodiments, the system 100 includes a video storage module 150 and a rules/metadata storage module 155. The video storage module 150 stores video captured from the video surveillance system 105. The video storage module 150 can include VCRs, DVRs, RAID arrays, USB hard drives, optical disk recorders, flash storage devices, image analysis devices, general purpose computers, video enhancement devices, de-interlacers, scalers, and/or other video or data processing and storage elements for storing and/or processing video. The video signals can be captured and stored in various analog and/or digital formats, including, as examples only, Nation Television System Committee (NTSC), Phase Alternating Line (PAL), and Sequential Color with Memory (SECAM), uncompressed digital signals using DVI or HDMI connections, and/or compressed digital signals based on a common codec format (e.g., MPEG, MPEG2, MPEG4, or H.264).

The rules/metadata storage module 150 stores metadata captured from the video surveillance system 105 and the external sensor networks 110 as well as rules against which the metadata is compared to determine if alerts should be triggered. The rules/metadata storage module 155 can be implemented on a server class computer that includes application instructions for storing and providing alert rules to the alert/search processing module 120. Examples of database applications that can be used to implement the video storage module 150 and/or the rules/metadata storage module 155 the storage include MySQL Database Server by MySQL AB of Uppsala, Sweden, the PostgreSQL Database Server by the PostgreSQL Global Development Group of Berkeley, Calif., or the ORACLE Database Server offered by ORACLE Corp. of Redwood Shores, Calif. In some embodiments, the video storage module 150 and the rules/metadata storage module 155 can be implemented on one server using, for example, multiple partitions and/or instances such that the desired system performance is obtained.

A variety of external sensor networks 110 can provide data to the system 100. For example, POS networks involve of a number of stations (e.g., cash registers, scanners, etc.) connected to a network and when activated, sensors in the stations transmit a customer's transaction information (product, price, customer ID, etc.) as well as the status of the cash drawer (e.g., open or closed) to the network. Similarly, EAS networks typically include a number of pedestals situated near the exits of a retail store that sense the presence of activated EAS tags placed on high-value (or in some cases all) products. When the presence of a tag is detected, the pedestal transmits information over the network to a central location. Many commercial buildings also employ security systems that sense the opening and closing of doors and use "card-swipe" systems that require employees to swipe or present identification cards when entering or leaving the facility. In accordance with the present invention, some or all of these sensor-based monitoring systems 110 are integrated with the video surveillance system 105 to enhance its capabilities and accuracy. Of course, the above list of sensor types is not exhaustive, and merely provides examples of the types of sensor networks 110 that can be accommodated.

In one non-limiting example, the sensor network 110 includes an RFID subsystem that itself includes transmitters (also referred to as "base stations" or "stations") that interact with transponders placed on objects being tracked by the surveillance system 100. The stations intermittently (every $n^{th}$ millisecond, for example, where n is a selected integer) transmit RF energy within some effective radius of the station. When a transponder enters this effective radius, the RF energy "wakes up" the transponder, which then interacts therewith to impart an identification signal to the station. The signal typically includes various information about the object to which the transponder is attached, such as a SKU code, a source code, a quantity code, etc. This data is augmented with information from the transmitter (e.g., a transmitter ID and date/timestamp), and can be saved as a unique record. By placing multiple transmitters about an area (throughout a store or warehouse, for example), the RFID subsystem can be used to determine the location and path of an object carrying the RFID tag using the coordinates of the transmitters and the times they interacted with the transponder.

In some embodiments, the alerts created by the alert/search processing module 120 can be transmitted to output devices 145 such as smart or dumb terminals, network computers, wireless devices (e.g., hand-held PDAs), wireless telephones, information appliances, workstations, minicomputers, mainframe computers, or other computing devices that can be operated as a general purpose computer, or a special purpose hardware device used solely for serving as an output devices 145 in the system 100. In one example, security officers are provided wireless output devices 145 with text, messaging, and video capabilities as they patrol a monitored environment. As alerts are generated, messages are transmitted to the output devices 145, directing the officers to a particular location. In some embodiments, video can be included in the messages, providing the patrol officers with visual confirmation of the person or object of interest.

In some embodiments, the output devices 145 can also include geographic information services (GIS) data. In such implementations, maps and/or floor-plans (either actual photographs or graphical representations thereof) are combined with iconic and textual information describing the environment and objects within the environment. For example, security personnel working at a large retail store can be provided with wireless, hand-held devices (such as the SAMSUNG SCH i730 wireless telephone) which are capable of rendering still and/or video graphics that include a floor-plan and/or parking areas near the store. Using GPS coordinates obtained via similar devices (or, in some cases, RFID base stations located throughout the store), the locations of various displays, personnel, vendors, or groups can be determined and displayed as a map of the store. In this way, features common to all sites but possibly situated in different locations can be mapped with respect to each site.

As the system 100 analyzes movements of customers and other objects, the alert/search processing module 120 uses metadata received from the video surveillance system 115 and the external sensor networks 110 to determine if one or more rules are met, and if so, generates alerts. As one example, an object ID associated with a customer and a product ID associated with a product of interest can be linked using manual association and/or automatic techniques (based, for example, on repeated detection of the two objects in close proximity). If the product and the customer are determined to be co-located (either repeatedly, continuously, or at some defined interval), an alert can be generated indicating the customer has placed the product in her shopping cart. A subsequent indication that the product was sensed at an RFID station at the exit of the store, and the absence of an indication that the product was scanned at a POS station, may indicate a shoplifting event. The alert can then transmitted to the security personnel, who, using the GIS-enabled devices, can see the location of the product and the customer on the store floor-plan.

In some embodiments, additional data can be added to the display, such as coloring to represent crowd density or a preferred path, to further facilitate quick movement of security personnel to a particular locations. Color enhancements can also be added to indicate the speed at which an object is moving, or the degree of threat the object poses to the monitored environment. In some cases, updates can be transmitted to the display to provide a real-time (or near-real-time) representation of the events and objects being monitored.

Figure 2:
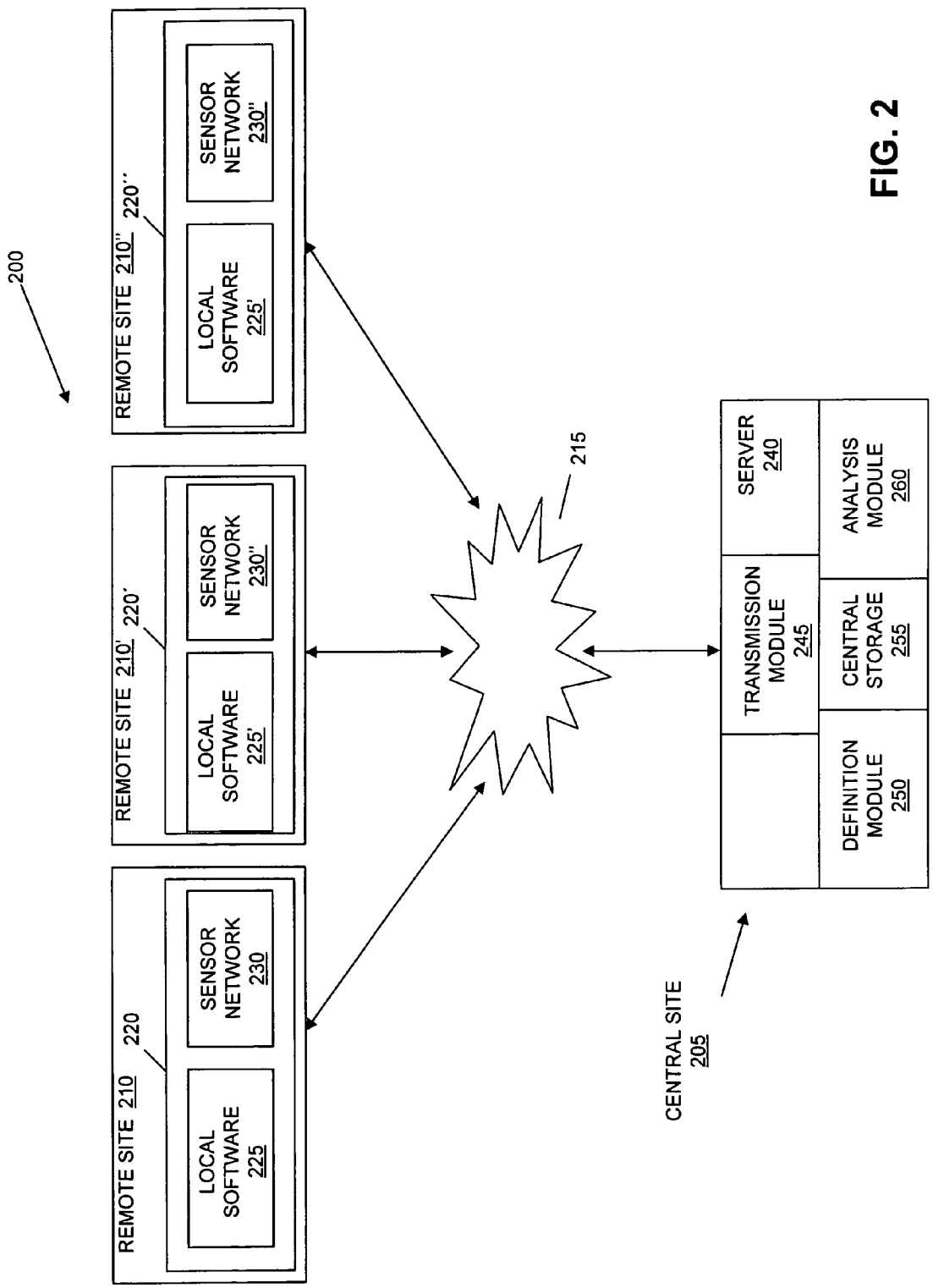
FIG. 2 is a block diagram of an embodiment of a surveillance system having both centralized and remote processing capabilities according to one embodiment of the invention.

FIG. 2 illustrates an exemplary implementation 200 of the invention in which multiple video surveillance and sensor network systems 100 are deployed in a distributed fashion to facilitate monitoring multiple sites. As illustrated, the distributed video surveillance and sensor network system 100 includes at least one centralized site 205, and at multiple remote sites 210, 210', 210" (generally, 210) that communicate over a network 215. As shown, the system includes three remote sites, but this is only for exemplary purposes, and in fact there can be any number of sites 210. Each remote site can include one or more components 220, 220', 220" (generally, 220) of the video surveillance and sensor network system 100 such as local client software 225 and/or one or more sensor networks 230 for monitoring the remote site. In some implementations, a complete implementation of the intelligent video surveillance system 105 can reside at each (or some) of the remote sites 210. For example, certain remote sites (e.g., warehouses, stores located in large metropolitan areas, etc.) may be large enough to warrant a complete implementation of the system, whereas implementations at other, typically smaller sites may be limited to the sensor devices which transmit captured data to the central site 205. In some implementations, multiple remote sites 210 provide video and/or sensor network data to some number (typically greater than one, and less than the number of remote sites) of intermediate sites for processing, analysis and/or storage.

The local client software 225 can facilitate remote connections to a server at the central site 205. In such embodiments, the local client software 225 can include a web browser, client software, or both. The web browser allows users at a remote site 210 to request web pages or other downloadable programs, applets, or documents (e.g., from the central site 205 and/or other remote sites 210) with a web-page request. One example of a web page is a data file that includes computer-executable or interpretable information, graphics, sound, text, and/or video, that can be displayed, executed, played, processed, streamed, and/or stored and that can contain links, or pointers, to other web pages. In one embodiment, a user of the local client software 225 manually requests a web page from the central site 205. Alternatively, the local client software 225 can automatically make requests with the web browser. Examples of commercially available web browser software include INTERNET EXPLORER, offered by Microsoft Corporation, NETSCAPE NAVIGATOR, offered by AOL/Time Warner, or FIREFOX offered the Mozilla Foundation.

The local client software 225 can also include one or more applications that allow a user to manage components of the sensor network 230 and/or the rules relating to the monitoring of that particular site 210. The applications may be implemented in various forms, for example, in the form of a Java applet that is downloaded to the client and runs in conjunction with a web browser, or the application may be in the form of a standalone application, implemented in a multi-platform language such as Java, visual basic, or C, or in native processor-executable code. In one embodiment, if executing on a client at a remote site 210, the application opens a network connection to a server at the central site 205 over the communications network 215 and communicates via that connection to the server. In one particular example, the application may be implemented as an information screen within a separate application using, for example, asynchronous JavaScript and XML ("AJAX") such that many of the user-initiated actions are processed at the remote site. In such cases, data may be exchanged with the central site 205 behind the scenes and any web pages being viewed by users at the remote sites need not be reloaded each time a change is made, thus increasing the interactivity, speed, and usability of the application.

For example, the remote sites 210 can implement the local software 225 on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS of Santa Clara, Calif., and GNU/Linux from RED HAT, INC. of Durham, N.C. (and others). The local software 225 can also be implemented on such hardware as a smart or dumb terminal, network computer, wireless device, wireless telephone, information appliance, workstation, minicomputer, mainframe computer, or other computing device that is operated as a general purpose computer or a special purpose hardware device used solely for serving as a client in the surveillance system.

The central site 205 interacts with the systems at each of the remote sites 210. In one embodiment, portions of the video surveillance and sensor network system 100 such as the intelligent video surveillance system 105 are implemented on a server 240 at the central site 205. In such instances, the server 240 is preferably implemented on one or more server-class computers that have sufficient memory, data storage, and processing power and that run a server class operating system (e.g., SUN Solaris, GNU/Linux, and the MICROSOFT WINDOWS family of operating systems). System hardware and software other than that described herein may also be used, depending on the capacity of the device and the number of sites and the volume of data being received and analyzed. For example, the server 240 may be or may be part of a logical group of one or more servers such as a server farm or server network. As another example, there can be multiple servers that may be associated or connected with each other, or multiple servers can operate independently, but with shared data. In a further embodiment and as is typical in large-scale systems, application software can be implemented in components, with different components running on different server computers, on the same server, or some combination. In some embodiments, the server 240 may be implemented at and operated by a service bureau or hosting service on behalf of different, sometimes unrelated entities who wish to outsource such services.

The communications network 215 connects the remote implementations with the server 240 using a transmission module 245 at the central site 205. Non-limiting examples of applications capable of performing the functions of the transmission module include the APACHE Web Server and the WINDOWS INTERNET INFORMATION SERVER. The communication may take place via any media and protocols such as those described above with respect to FIG. 1. Preferably, the network 215 can carry TCP/IP protocol communications, and HTTP/HTTPS requests made by the local software and/or the server and the connection between the local software 225 and the server 240 can be communicated over such TCP/IP networks. The type of network is not a limitation, however, and any suitable network may be used. Non-limiting examples of networks that can serve as or be part of the communications network 215 include a wireless or wired Ethernet-based intranet, a local or wide-area network (LAN or WAN), and/or the global communications network known as the Internet, which may accommodate many different communications media and protocols.

In embodiments in which some or all of the processing and analysis is performed at the central site 205, the server 240 can also include various application modules for the definition, storage and analysis of data and rules relating to the monitoring of the remote sites 210. For example, a definition module 250 facilitates the definition of rules relating to events of interest that may occur at the remote sites and floor-plans for attributing the rules to sites (either in general or at specific sites), as described in greater detail below.

The server 240 can also include a central storage module 255, such as a database system which stores data received from the remote sites 205, rules related to the events of interest, user permissions, industry data, and the like in one or more databases. The database typically provides data to other modules residing on the server 240 and the local software 225 at the remote sites 205. For instance, the database can provide information to an analysis module 260 that compares video data with defined rules to determine if a particular event has occurred. In some embodiments, the analysis module reviews historical data, attempting to identify peculiarities within the data, such as high instances of a particular event at certain sites as compared to other sites. The central storage module 255 may also contain separate databases for video, non-video sensor data, rule components, historical analysis, user permissions, etc. Examples of database servers that can be configured to perform these and other similar functions include those described with respect to the storage module of FIG. 1.

The server 240 can also act as a mass memory device for storing application instructions and data for communicating with the remote sites 210 and for processing the surveillance data. More specifically, the server 240 can be configured to store an event-detection and surveillance application in accordance with the present invention for obtaining surveillance data from a variety of devices at the remote sites 210 and for manipulating the data at the central site 205. The event-detection and surveillance application comprises computer-executable instructions which, when executed by the server 240 and/or the local software 225 obtains, analyzes and transmits surveillance data as will be explained below in greater detail. The event detection and surveillance application can be stored on any computer-readable medium and loaded into the memory of the server 240 using a drive mechanism associated with the computer-readable medium, such as a floppy, CD-ROM, DVD-ROM drive, or network drive.

In many implementations, the remote sites 210 can be homogeneous in function and/or design; however, in many instances one or more of the sites 210 will differ from the others. For example, a department-store chain may implement a system in accordance with the present invention across some or all of its warehouses, distribution centers and retail stores, such that the floor-plans, activities and operational schedules for the various sites are different. In some instances, certain sites may be quite similar (e.g., similarly designed storefronts) but may benefit from different surveillance strategies due to environmental differences such as the neighborhood in which the stores are located and/or promotional events that are unique to a particular store. In such instances, it is difficult to define a global ruleset describing the various aspects of events of interest at each location without having a significant impact on accuracy or overburdening staff at each site.

Figure 3:
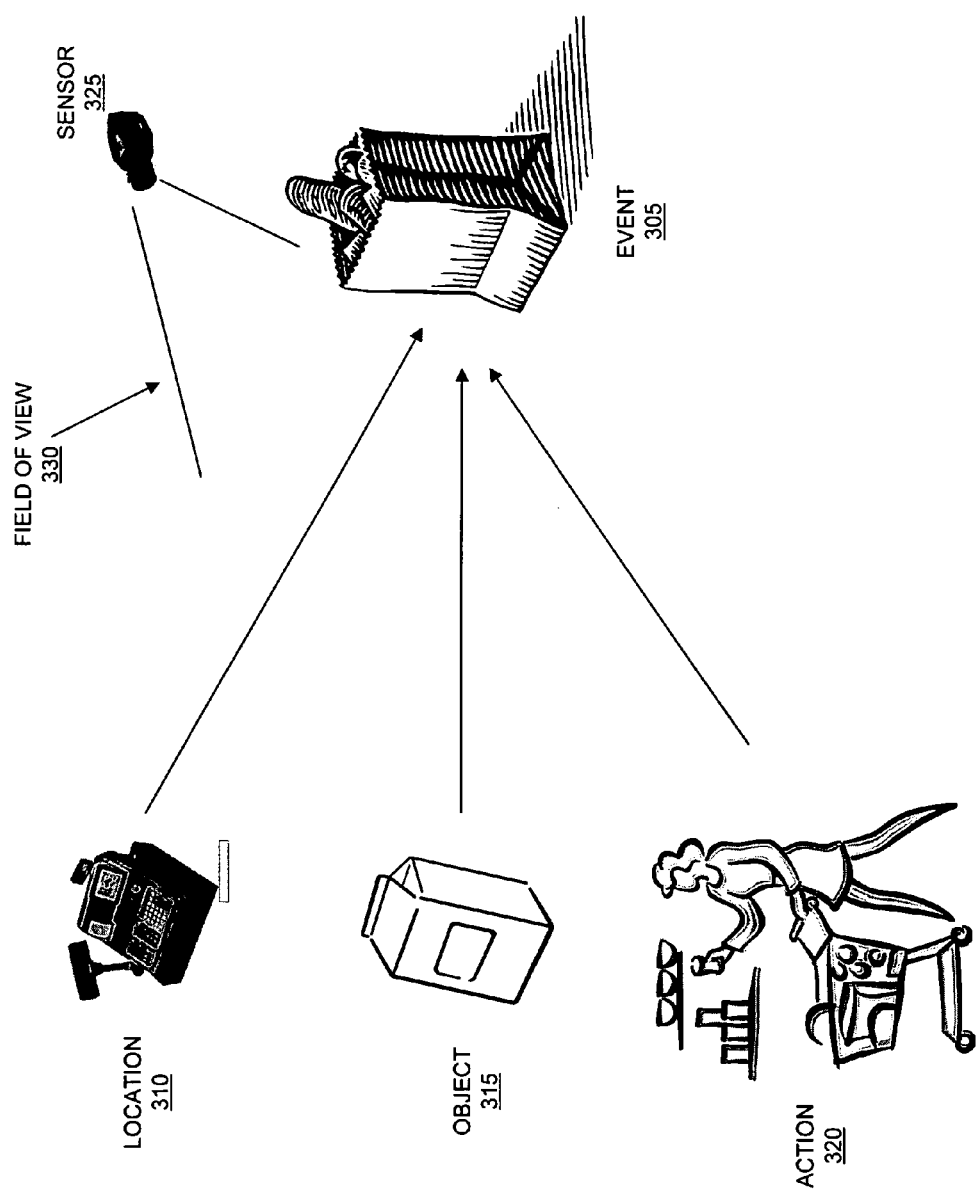
FIG. 3 is an illustration of various components used to define events within a surveillance system according to one embodiment of the invention.

FIG. 3 illustrates a multi-component event construct that balances the need for centralized rule definition and scalable implementation with the desirability of localized input and customization at the remote sites. Generally, the construct of the present invention combines multiple components, some of which are global in nature—i.e., characteristics not specific to any particular site with components that are site-specific—to form events 305. The occurrence (or non-occurrence) of events 305 can then be detected based on the detection of each component as defined in the event. For example, one component of an event can be a location 310 such as a point-of-sale counter, an exit, a hallway, doorway or other physically-identifiable place. Components of events 305 can also include objects 315, such as a particular item in a retail store, and actions 320 such as the selection and/or purchase of the object 315 or movement of a person about the site.

The events can be implemented as rules that are used to test for the occurrence or non-occurrence of the events at one or more sites. One possible form for the rules uses Boolean logic. Using a fraudulent employee return event as an example, a rule can be expressed as "if ((RETURN PROCESSED on POS #XXX) and (not (OBJECT #YYY PRESENT in camera view #ZZZ))) then ALERT." Here "XXX" refers to a unique ID number assigned to each POS station, "YYY" refers to a specific product, and "ZZZ" refers to a unique ID number assigned to a camera that has a field-of-view corresponding to the POS station. The definition of the rule, and hence the association of the POS station ID with the region ID, can be formulated manually by a user of the system at the site who has knowledge about the particular POS station and the camera locations, whereas the product information may be defined globally by a user who lacks site-specific knowledge, but knows that that particular item is often stolen or fraudulently returned.

In general, an alert rule combines events and components of the events together using Boolean logic (for example, AND, OR, and NOT operators) that can be detected on a given sensor network. For example, POS events can include "RETURN PROCESSED," "CASH DRAWER OPEN," "ITEM ZZZ PURCHASED," etc. Video system events can include "OBJECT PRESENT," "OBJECT MOVING," "NUM OBJECTS>N," etc. Security system events can include "CARD #123456 SWIPED," "DOOR OPEN," "MOTION DETECTED," etc.

The events can be combined together with Boolean logic to generate alert expressions, which can be arbitrarily complex. A rule may consist of one or more alert expressions. If the entire expression evaluates to "true," then an alert is generated. For example, consider an alert to detect if two people leave a store when an electronic article surveillance (EAS) event is detected. The event components are "TAG DETECTED" and "NUM OBJECTS>2." If both are true, then the event has occurred and the alert fires. The compound expression is thus "(TAG DETECTED on EAS #123) and (NUM OBJECTS>2 in region #456)." As before, unique ID numbers are used to relate the particular EAS pedestal to a region of interest on the appropriate camera.

As another example, an alert can be triggered based on detecting two people entering a restricted access door using one credential (commonly referred to as "piggybacking"). The alert rule is similar to the above EAS alert rule: "if ((DOOR OPENED on DOOR #834) and (NUM OBJECTS>2 in region #532)) then ALERT." Other alerts can be based on movements of objects such as hazardous materials, automobiles and merchandise that determine if the object is moving into a restricted area, is moving too quickly, or moving at a time when no activity should be detected.

Similar to detecting employee return fraud, it is often useful to know when the cash drawer of a POS station is opened and a customer is not present. Such event is often indicative of employee theft. As an example of a more complex rule, detection of this event can be combined with the employee return fraud rule so that both cases can be detected with one rule: "if (((RETURN PROCESSED on pos #XXX) or (CASH DRAWER OPENED on pos #XXX)) and (not (OBJECT PRESENT in region #YYY))) then ALERT."

Together, each component provides a piece of the event, such as an item being selected by a customer and brought to a cash register. Although such an event can be defined in the abstract—i.e., without reference to any particular register, the monitoring device 325 being used to oversee the register, or the operational area 330 of the device (e.g., a field-of-view of a camera or operational radius of an RFID sensor)—the event is not completely accurate until such information is added to the event. Therefore, the ability to distribute the definition of individual event components to personnel uniquely familiar with the physical attributes of individual sites allows the general purpose of the events to remain consistent among the sites while permitting the necessary customization of the events to account for different physical characteristics of the sites.

In many cases, each of the remote sites will share certain characteristics (e.g., they all have aisle ways, doors, dressing rooms, displays, etc.) but the specific configuration characteristics will differ. As an example, a convenience store chain may have a self-serve food area, refrigerated cases, and restrooms in each store, but because of the different floor-plans, the physical relationship among these areas will differ. More specifically, the refrigerated case in one store may be along a back wall and the check-out counter located along the same wall as the exit, whereas in another store the refrigerated case is in an aisle in the middle of the store and the check-out counter is opposite from the exit.

To further ease the implementation of the defined events as they relate to a particular store, a generic site template (or series of templates) can be defined that represents a "canonical form" of the site floor-plans from each remote site. For example, the canonical floor-plan may define any number of generic attributes and physical characteristics of a site (e.g., walls, exits, aisles, rooms, etc.) that are common among the sites, and in some cases associate events with one or more elements of the floor-plan, as described in further detail below. In some embodiments, the canonical floor-plan can include a combination of generic characteristics and site-specific elements if, for example, the user has some knowledge of a particular set of site layouts.

Figure 4:
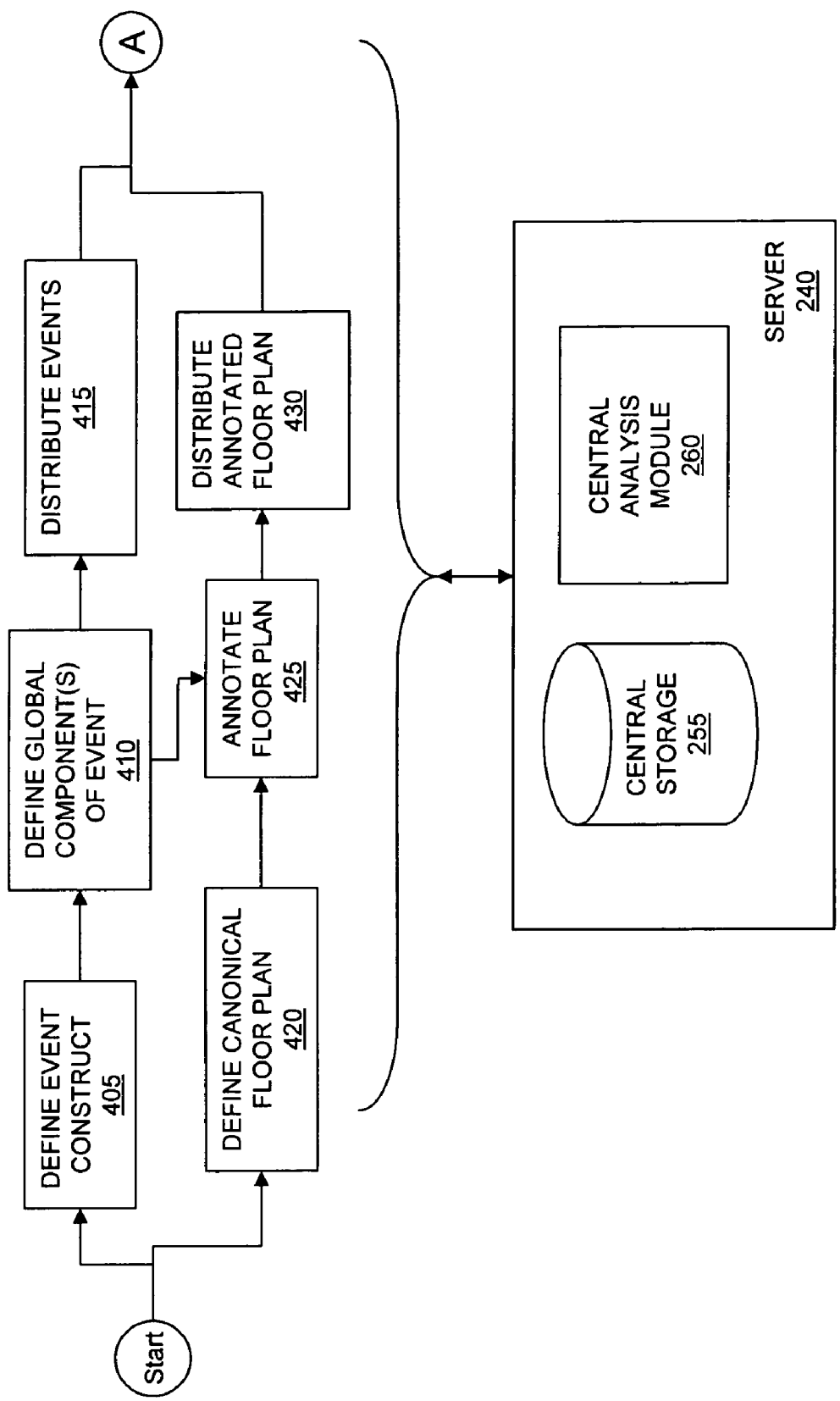
FIG. 4 is a flow chart depicting a method for implementing a surveillance system according to one embodiment of the invention.
Figure 5:
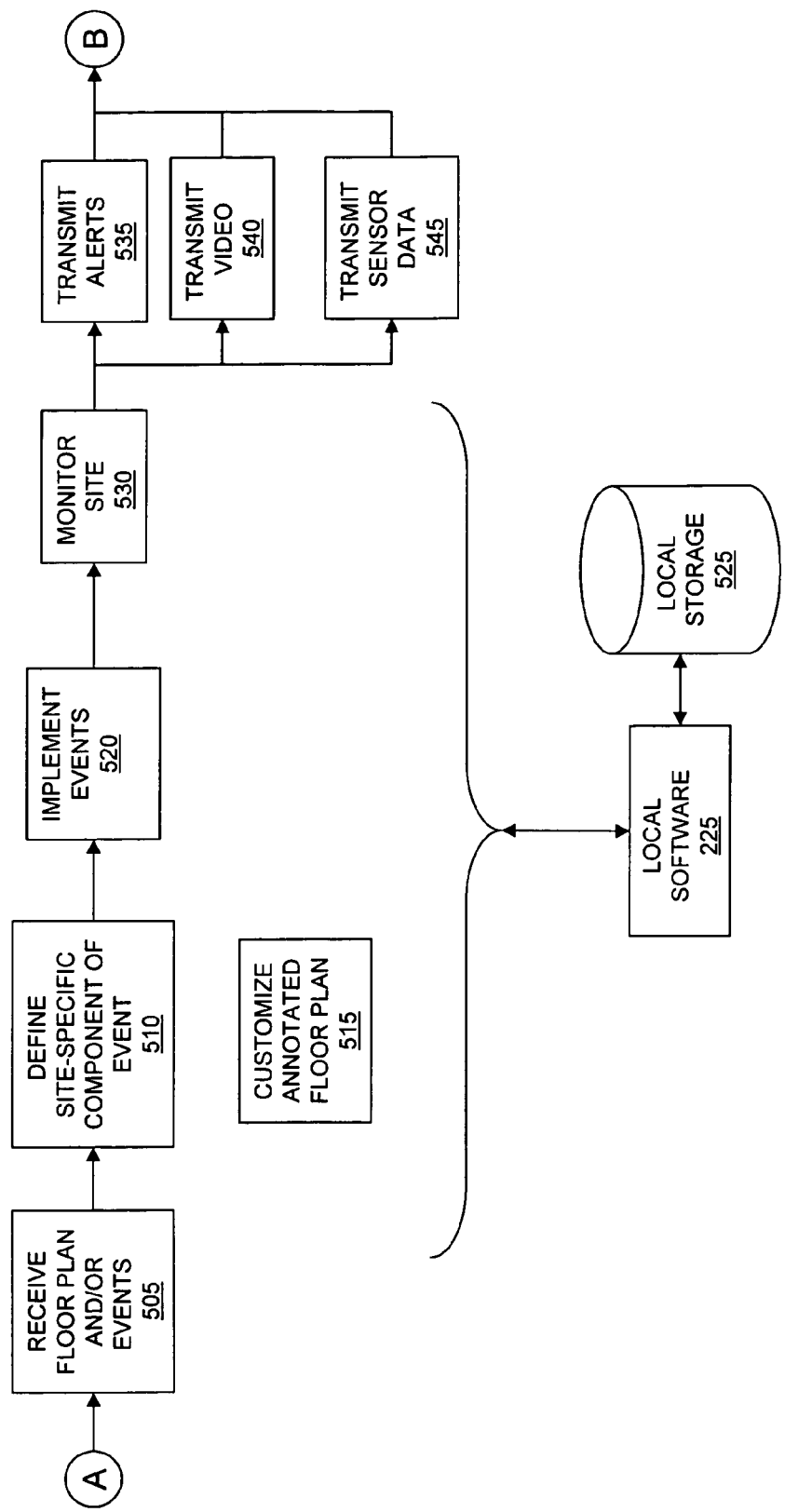
FIG. 5 is a flow chart depicting additional steps of a method for implementing a surveillance system according to one embodiment of the invention.
Figure 6:
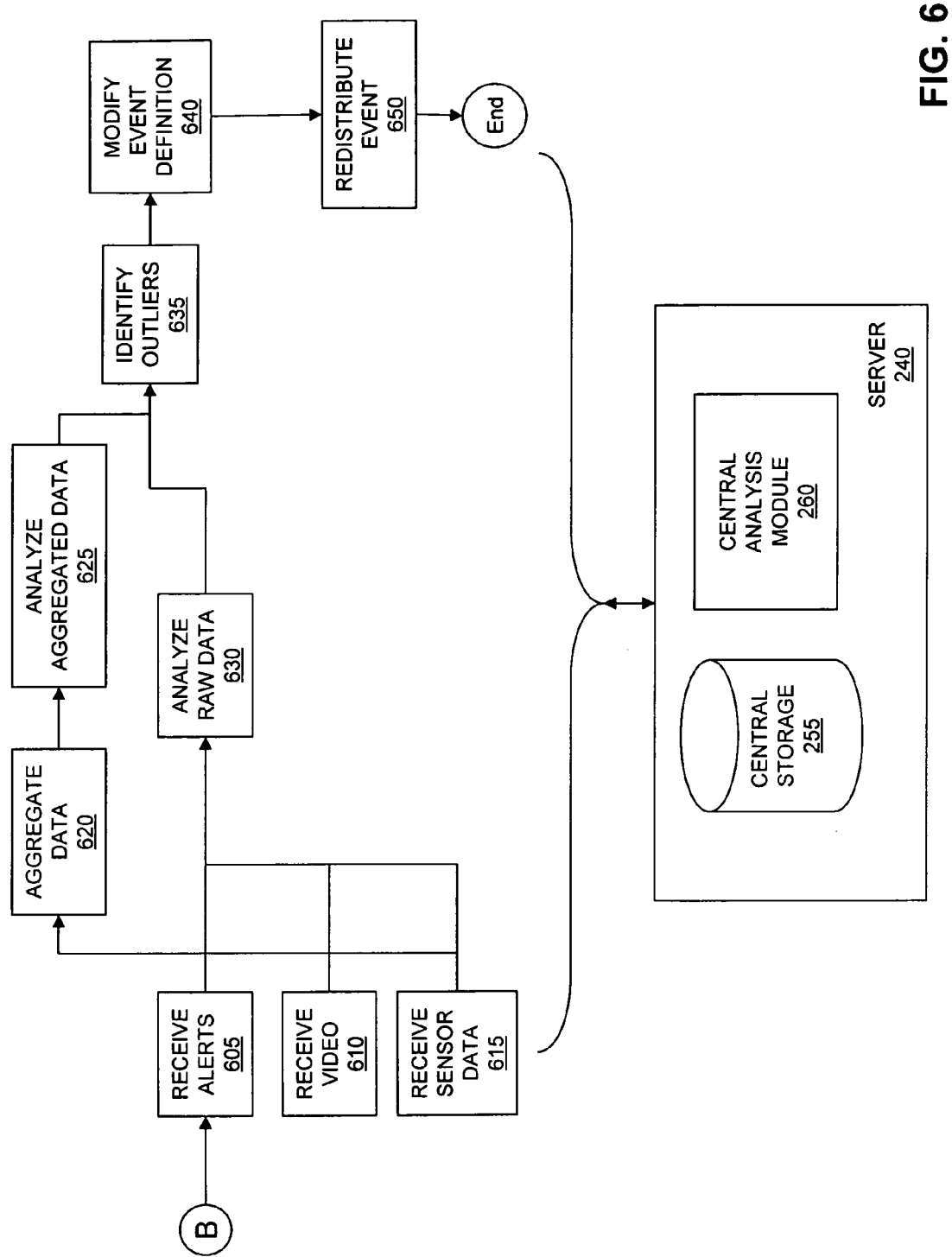
FIG. 6 is a flow chart depicting additional steps of a method for implementing a surveillance system according to one embodiment of the invention.

FIGS. 4-6 illustrate various embodiments of a technique for implementing a rule-based surveillance system across multiple disparate sites. The process can be generally divided into three distinct phases: a definition phase (generally illustrated in FIG. 4), during which global attributes of events are defined and a generic site floor-plan can be developed at the central site; a customization and monitoring phase (generally illustrated in FIG. 5), during which the events and/or floor-plans can be tailored to the individual sites and used to monitor the activities at the sites; and an alert and analysis phase (generally illustrated in FIG. 6), during which alerts and sensor data are received at the central site and analyzed to identify trends and anomalies in the data.

In describing the various tasks of the technique, two user roles are referred to throughout the text below. First, a "central user" is responsible for performing the tasks attributed to the central site that, in general, are global in nature—i.e., are applicable to some set (in some cases all) of the remote sites. Second, a "remote user" is responsible for tasks attributed to the remote sites that, in general, are specific to a particular (or some small group) of remote sites. Typically, such tasks are delegated to the remote user because the central user lacks the site-specific knowledge to perform the task (e.g., assigning a particular camera to an event) or the volume of tasks is such that the distribution of the work across a larger number of users is more efficient.

Referring to FIG. 4, a central user of the system performs various tasks that define site-independent components of the events, as well as one or more generic floor-plans that can be used as starting points for site-specific floor-plans. More specifically, the central user defines an event construct (STEP 405) by identifying the various components of the events. As described above, the components can be site-independent or site-specific. Examples of site-independent event components include actions (e.g., item selection, movement, purchase, etc.) and objects (e.g., people, products, cars, money, etc.). Examples of site-specific components include monitoring sensors such as cameras, point-of-sale stations, RFID transmitters, proximity-card readers and other devices disposed about the sites for the purpose of receiving surveillance data.

Components such as locations can be both site-independent and site-specific. For example, the central user may define locations in a general nature—e.g., exits, point-of-sale counters, dressing rooms, parking lots and/or product-specific aisles or displays—in cases where such locations are known to exist at each (or some number of) the remote sites. These locations can them be customized by remote users by converting the abstract locations defined at the central site into actual locations at the remote site.

With the various components of the events defined, the central user can specify the information for some or all of the global components (STEP 410). For example, the central user can specify that an event be based on an action (e.g., a selection) attributed to two objects (e.g., a customer and a particular product). In some embodiments, the events can include combinations of multiple actions, multiple objects and multiple locations, and non-occurrences of each. Each component can have one or more thresholds associated with it, such as date/time parameters, and counts, and in some cases these parameters can be set by the central user, the remote users, or both. The parameters can also be reset manually and/or automatically based on meeting a threshold and/or the occurrence or non-occurrence of an event. By attributing time-based parameters to the actions, the thresholds of the events can be adjusted in a manner that permits the event to be accurately detected while minimizing false positives. For example, an event directed to detecting shoplifting may include three action components such as an item selection, an exit, and the absence of a sale, two item components such as a person and an particular item of merchandise, and two location components, a point-of-sale counter and an exit. Once defined, the events can be distributed (STEP 415) to the remote sites for further customization and implementation.

In some embodiments, the central user also defines one or more canonical floor-plans (STEP 420) that can be used as templates for the remote locations. In some cases, one canonical floor-plan can be used for all remote sites; however, in many cases multiple canonical floor-plans can be designed as templates for subsets of remote sites that share numerous features. For example, a large retail chain may have numerous warehouses and distribution centers as well as a number of different branded stores, such as stores targeting teenagers, stores targeting parents of infants, and stores targeting professionals. In such a case, the central user can define a canonical floor-plan for each type of site. In some instances, a canonical floor-plan for one type of site (e.g., the teen-focused stores) can be used as a template for the canonical floor-plan (with minor modifications possibly) for other sites, such as the stores targeting professionals. The number of different canonical floor-plans that can be created is virtually unlimited, but generally will be determined by the degree of similarity among the sites and the availability of the central user to design the floor-plans. The canonical floor-plans can also be annotated with one or more events (STEP 425) and distributed to the remote sites (STEP 430). The remote users are thus provided with a starting set of events and a generic floor-plan from which they can build a site-specific floor-plan and complete the event definitions by adding the site-specific components.

Each of the event constructs, events, floor-plan templates, and combinations thereof can be stored, for example, in the central storage module 255 of the server 240 at the central site.

Referring to FIG. 5, the remote users receive the events and/or floor-plans (STEP 505) and, using the local software and systems described herein, customize the events and/or floor-plans to meet the individual needs of each remote site, or, in some cases, groups of remote sites. The remote users can, for example, define site-specific components of the events (STEP 510) that were initiated by the central user by adding or modifying location components that are unique to a particular site. For example, a remote user may assign one or more surveillance sensors to a location, such that a "select item from beverage display" event is associated with a camera having a field-of-view that includes the display, an RFID sensor that has an operational radius that includes the display, and/or other sensors used to track the location or movement of objects in the display. In implementations where the field-of-view of a camera (or other sensor) is subdivided into multiple sub-regions, the remote user can assign both a camera ID and a sub-region ID to the event by selecting an area of the floor-plan and sub-region using an interactive graphical interface.

In some embodiments, remotely-defined events and/or the components that make up the events can be re-used at individual sites, as well as by the central user, such that the central user can take advantage of the remote user's knowledge of the site in building subsequent events and floor-plan templates. For example, the central user can define a location component such as "makeup endcap" for inclusion on a retail store floor-plan, and have certain parameters (height, time periods, sensor ID numbers) associated with it based on a location defined by a remote user.

The remote users can also set parameters associated with the events. For example, certain stores may keep different hours than others, or have particular times that require additional security, and thus the time parameters that govern the events may differ from store to store. As another example, the allowable time-span between two events (e.g., a shopper selecting an item and exiting a store) may need to be greater in stores having a larger footprint than smaller stores.

In embodiments where a canonical floor-plan is received at a remote site, the remote user can customize the floor-plan (STEP 515) to meet the needs of the particular site. For example, the central user may have provided a generic layout having four aisles, two point-of-sale positions, and one exit. However, if the remote site has six aisles, three point-of-sale positions, and two exits, the remote user can add the necessary elements so the floor-plan more accurately represents the actual layout of the site. Furthermore, the central user may have arranged the elements in a general manner, without regard to the relationships among the elements and/or the surrounding walls. Again, the remote user can manipulate the floor-plan (using, for example, the local software 225 described above and in additional detail below) so that it mirrors (or closely resembles) the actual site.

In some instances, the central user may have defined an event and associated it with an element of the canonical floor-plan, such as associating a customer selection of an item of merchandise with a specific aisle, based on his belief that such an association is common across many sites. However, in cases where such an association is not accurate (e.g., the product is not carried at a particular store, or it is kept behind the counter), the remote user can break the association, redefine the event, associate it with a different element of the floor-plan, or any combination of the foregoing. In certain instances, the remote user can delete a centrally defined event or event component if it does not match the remote site. By providing remote users with the building blocks of an event-driven surveillance system that maintains certain consistencies across many sites, yet allowing the events to be customized at the site level, the system balances the need for data commonality and site variability such that the central site will receive comparable data from the disparate sites.

Once the events and/or the floor-plan is customized for the site, events are implemented in the surveillance system (STEP 250). In some embodiments, the implementation includes saving the customized events and/or floor-plan to the central storage module at the server. In other embodiments in which the surveillance system (or portions thereof) are implemented at the remote sites, local storage 525 can be used to store the events and floor-plans, as well as the application code used by the system to monitor the site (STEP 530) for activities that implicate the events.

While (or even after) the system monitors the site, information can be transmitted (either programmatically, manually, or both) to the central site. For example, implementations in which the alert/search processing module (120 of FIG. 1) is located at remote sites, alerts are generated upon the occurrence of the events, and in addition to being dispatched to local security personnel, the alerts can also be transmitted (STEP 535) to the central site for analysis and comparison across multiple sites. In other embodiments, video data can also be transmitted (STEP 540) to the central site, either in real-time for event processing and alert generation, or periodically to provide central storage and analysis of the video and the associated metadata across sites. In some cases, the video data can be sent in batch mode (e.g., once nightly) during off-peak times to avoid congestion and overloading of data processing resources. Likewise, sensor data from other sensors (RFID, POS, etc.) can also be transmitted (STEP 545) to the central site for similar purposes.

Referring to FIG. 6, the alerts, video and/or sensor data is received (STEPS 605, 610, and 615) at the central site, where it can be stored (in the central storage module 255, for example) and processed. In some embodiments, the data is aggregated (STEP 620) and analyzed (STEP 625). The alerts can be aggregated and analyzed according to time, site (or sites), and/or objects specified within the events that triggered the alerts. For example, if personnel at the central site wish to compare shoplifting events related to a particular item (e.g., razors, baby formula, etc.) across multiple sites, all alerts based on events having those items can be selected and grouped by site. In some instances, the video and/or sensor data captured during the event can be further analyzed (STEP 630) to determine if the event was a false positive, or to ascertain if other actions or objects were present during the event that should be considered when modifying the events. The analysis can be performed, for example, using the central analysis module 260 residing on the server 240.

Based on the analysis, outliers may be identified (STEP 635) that indicate one or more events are defined improperly. By way of illustration, if an event was distributed to a large number of sites, the mean number of alerts received from each store may indicate a "typical" event rate for sites of that type. However, receiving a significantly higher or lower number of events (greater than two standard deviations from the mean, for example) from a particular site may indicate that the event is improperly defined at that site or that other parameters of the site are in fact different from those sites to which it is being compared. For example, the location-specific component of the event may be inaccurate (e.g., the wrong aisle was attributed to a product, or the wrong camera was assigned to an area), a sensor may be non-functional, or a remote user may have sabotaged the system to hide employee-based theft. In such cases, the central user can suggest modifications to the events, or in some cases make the modifications herself (STEP 640) and redistribute the events to the affected sites (STEP 650).

Inferred relationships among the sites, locations, events and objects within the sites can also be used to generate additional alerts, which can be distributed to the sites. For example, alerts received from two different sites at a certain interval comparable to the travel time between the two sites that indicate that the same (or a related) item of merchandise has been stolen may imply that the same person is responsible for both thefts. Once such a link has been identified, the central site can transmit a secondary alert (including, for example, text, video and/or both) to sites within some radius of the sites from which the items were stolen warning the sites to be aware of potential thefts. The identification of the remote sites can be based on manual selection of sites, or in some cases performed automatically based on historical data stored at the central site. In instances where the relationships among sites is distributed to the sites, secondary alerts can be generated at a first remote site and transmitted to those site or sites determined to be "related" to the first site, either by geography, product line, or other historical data.

In instances in which both the alerts and some or all of the sensor data is received at the central site, additional rules can be applied to the sensor data. For example, additional rules can be more complex in nature (determining, for example, patterns or trends in the data) and/or confirmatory (e.g., duplicates of rules distributed to remote sites to confirm the rules are returning the proper number of alerts). The sensor data can also be combined with actual alert data (both accurate and inaccurate) an used as input into a training algorithm in which the system can effectively "learn" to more accurately identify events of interest.

In addition to use with regard to security events, the data can also be used for marketing and operational purposes. For example, events can be defined to monitor sales activities during sales, new product introductions, customer traffic, or periods of interest. Alerts based on the occurrence of such events can be aggregated to compare overall customer experiences across multiple stores and at different times to determine the effectiveness of promotions, pricing and other merchandise-related occurrences.

Figure 7:
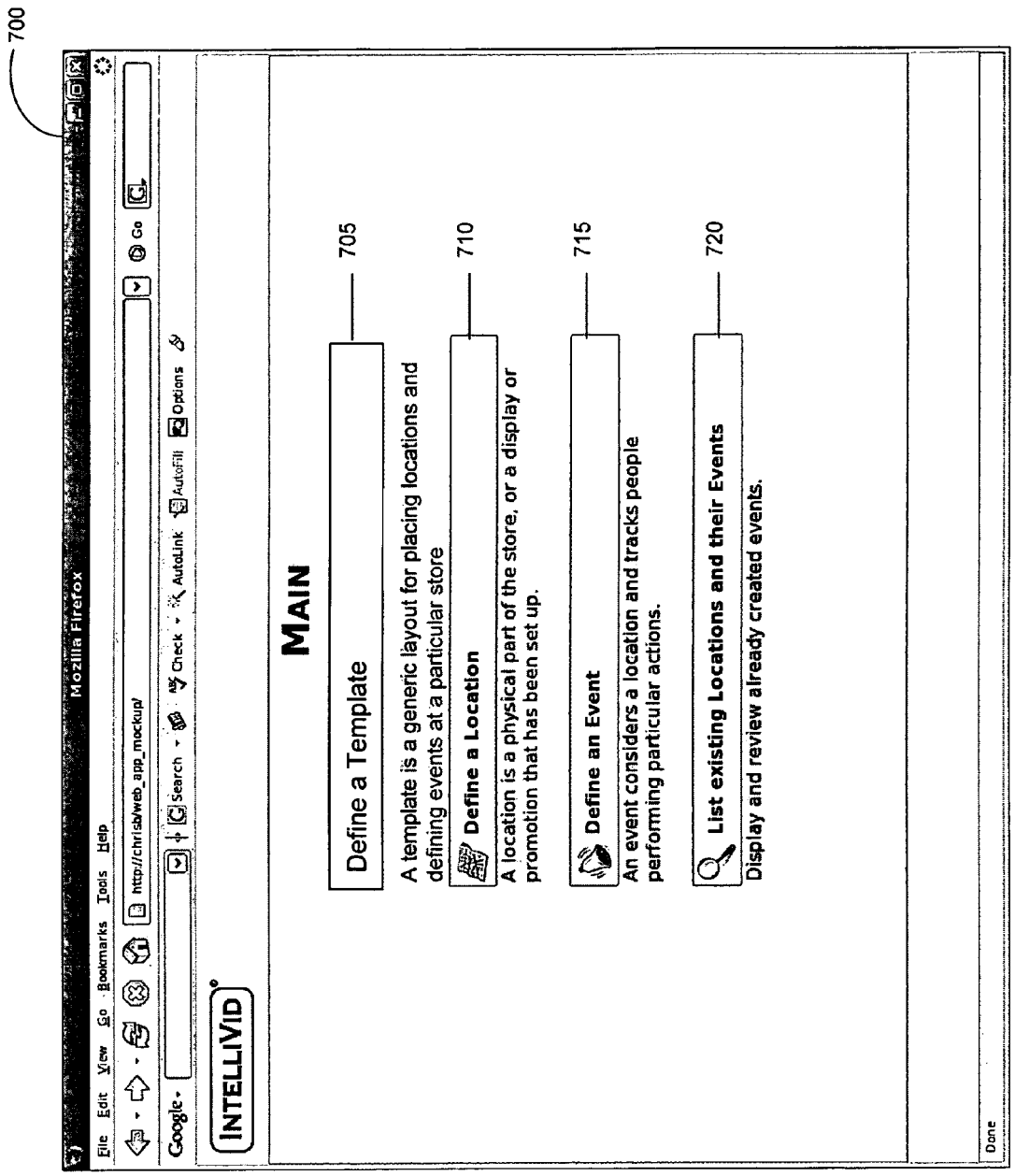
FIG. 7 is a screen capture of a user interface for implementing a surveillance system according to one embodiment of the invention.

Referring to FIG. 7, an example of an application screen includes a menu-driven user interface 700 for implementing the system and techniques described above. The interface 700 includes four main functions—template definition 705, location definition 710, event definition 715, and event/location display 720. The template-definition function 705 facilitates the definition and modification of the canonical floor-plans that can be used as starting points for site-specific layouts. The location definition function 710 facilitates the definition of a generic location at which one or more actions take place and objects interact. The specificity of the locations can range from the most generic—e.g., a door, to a specific location, such as loading dock #3 at warehouse #2. The event definition function 715 allows the user to define the events as combinations of one or more event components and also to associate attributes or parameters with the events, as described above and in more detail below with respect to FIG. 10. The event/location display 720 allows a user to review the locations and events that have been defined in the system, and the sites to which they have been assigned.

Figure 8:
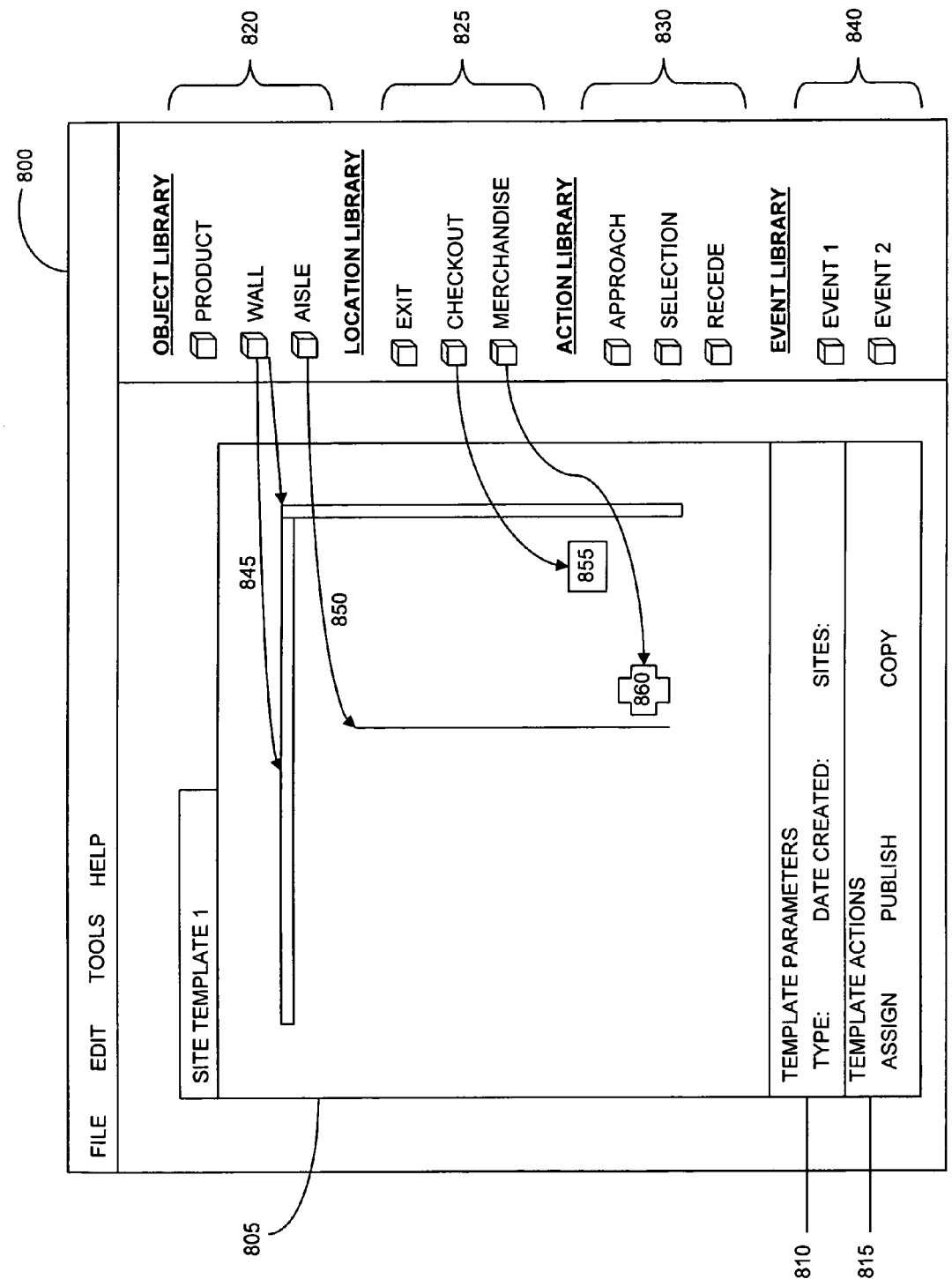
FIG. 8 is a representation of a user interface for defining floor plan templates for a surveillance system according to one embodiment of the invention.

Referring to FIG. 8, an example of an application screen includes a template-design user interface 800 for creating canonical floor-plans and templates. The user interface includes a site template 805, a template parameter selection area 810, and a template action area 815. The template 805 is implemented as an interactive interface that allows users to select, edit, add, delete and move elements of the floor-plan. In some embodiments, the elements are represented as application objects having attributes such as size and height, thus allowing the user to specify the relative size of an object with respect to other objects (e.g., in units, pixels, etc.) and in absolute terms (e.g., inches, feet, etc.). The template 805 can respond to "drag-and-drop" user/screen interactions based on keystrokes and/or commands entered using a pointing device such as a mouse or optical pen. In embodiments in which the user interface 800 is provided to the user via a browser application, the objects can be represented as objects within a Flash-based window, or an AJAX applet such that the user-initiated commands for editing and moving the template objects are processed largely on the client machine and requires minimal data transmission to and from a server.

The template parameter area 810 provides fields for entering and viewing parameters associated with to the template. More specifically, the user can specify the template type (e.g., warehouse, retail, two-story, suburban, generic, etc.) the date the template was created, and the site or sites to which the template has been assigned. The template actions area 815 provides actionable objects (such as hyperlinks, control buttons, combo-boxes and the like) that, when selected by a user, assign the template to a particular site (or group of sites), publish the template (e.g., to remote users), and copy the template to initiate the creation of a new template, for example.

The user interface 800 also includes libraries of template elements that can be used to create events, attribute elements to templates or both. Specifically, the user interface 800 can include an object library 820, a location library 825, an action library 830, and an event library 840. Each library provides a listing of the respective elements available to the user to either combine into an event (as described above) and/or position within the template. Each template library further provides the ability to add elements to the library as needed.

A user can annotate the templates with events and/or event components from the libraries by selecting a component and dragging the component into place on the template 805. For example, the user may wish to create a template with two fixed walls 845, an aisle 850, a checkout counter 855 and a merchandise display 860. In many cases, the floor-plan represented in the template will not actually describe any particular site, but can be used as a starting point by the remote users for customization (as described further below with reference to FIGS. 12 and 13).

In some embodiments, the user interface 800 can also include a sensor library (not shown) that provides a listing of the available sensors of the various sensor networks and video surveillance systems, thus allowing the user to add the locations of generic sensors (e.g., video camera) and/or specific sensors (e.g., camera #321) to the template. In instances where the template is being defined by a central user, the templates are stored at the central site and can be "published" to remote users when completed.

Figure 9:
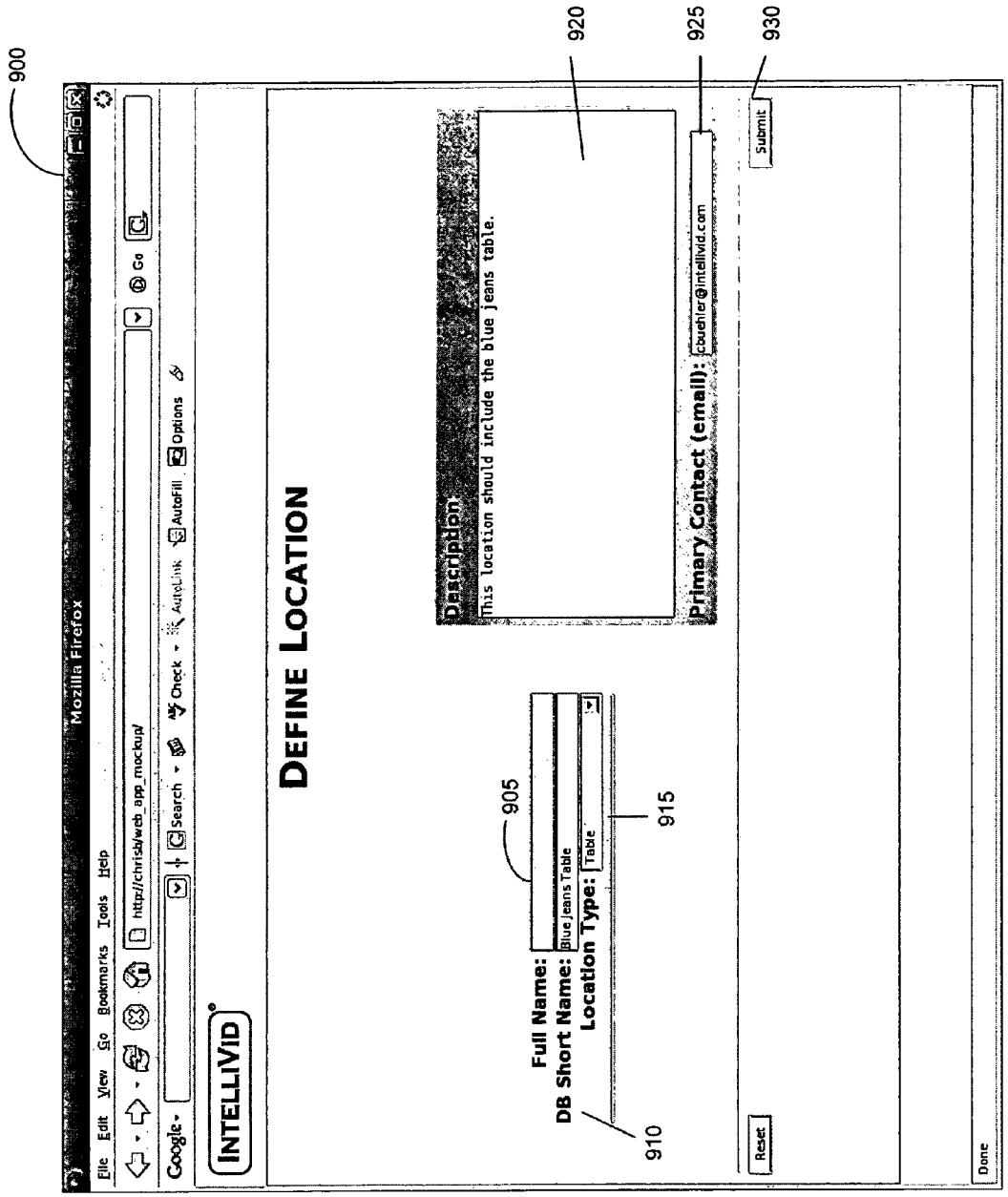
FIG. 9 is a screen capture of a user interface for defining location components of an event within a surveillance system according to one embodiment of the invention.

Referring to FIG. 9, an example of an application screen includes a location definition user interface 900 for defining locations within the location library, and that can be used to annotate floor-plans and/or create events. The user interface 900 includes fields 905 and 910 into which users can enter a full name (e.g., blue jeans table at front of store) and a short name (blue jeans table), respectively. A location type text box 915 provides the user with a field in which to specify the type of location (e.g., table, door, counter, restroom, parking structure, etc.) being defined. A description field 920 allows the user to enter a longer textual description of the location that can include, for example, coordinates of the location, instructions on implementing the location, and other relevant features of the location. A contact field 925 captures an attribute of the user creating the location such as an email address, user name, employee number or role. A submit button 930 saves the location and its attributes to the central storage module, the remote storage modules, or both, depending, for example on the user creating the location, the architectural implementation of the system, or other system-based parameters.

Figure 10:
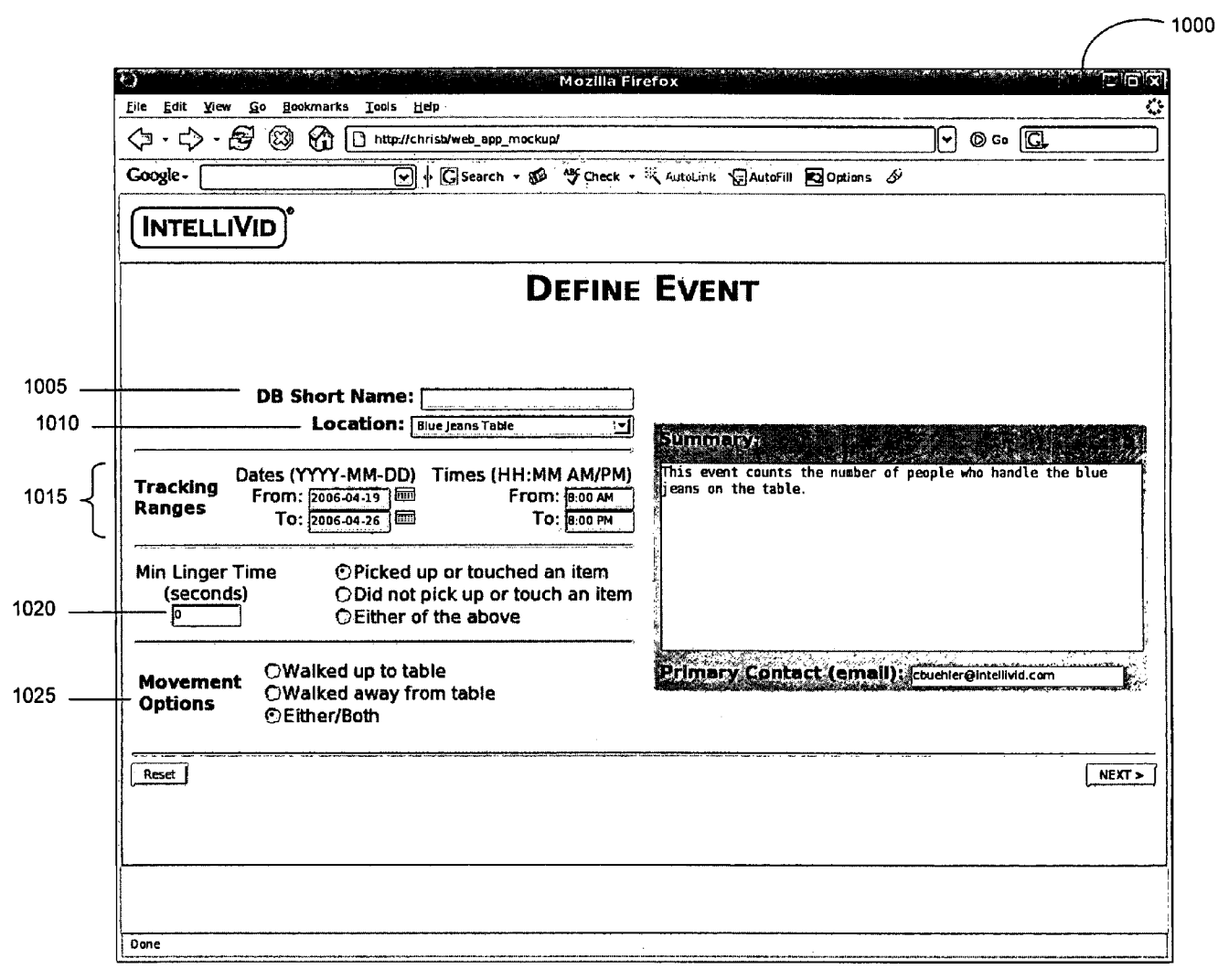

Referring to FIG. 10, an example of an application screen includes an event definition user interface 1000 for defining (and, once defined, modifying) an event within the system. As described above, an event can be constructed from one or more event components such as actions, locations and objects, as well as parameters that further describe how and when the event is implemented. Typically, the define event user interface 1000 is used by the central user to provide the site-independent components of the events, such as time parameters, generic locations, actions, and the like. However, in some embodiments, remote users may be given access to the define event functionality in order to create new events that are entirely site-specific. In some cases, a central administrator can grant or deny access to such functionality on a user-by-user basis. The user interface 1000 includes an event name field 1005 for capturing a moniker for the event, and to identify the event (uniquely, in some cases) within the data storage module(s). A location field 1010 provides a listing of available locations that can be associated with the event. Parameter fields 1015 provide the user with the ability to assign date and/or time boundaries on the event. For example, an event directed to detecting shoppers stopping at a display and selecting an item can be limited to the days and hours that the store is open.

Action selection items 1020 and 1025 facilitate the definition of action-based components of the event. In a retail setting, for example, actions surrounding a particular display may be of interest, such as a shopper stopping at a display, picking up an item, and placing it in a cart. However, accurately determining if such an event occurred may require attributing time-based parameters to certain actions. Specifically, to determine if a user stopped at a display, a "linger time" parameter can be used to detect whether the shopper actually paused at the display long enough (e.g., more than a few seconds) to view the merchandise. Likewise, a long lingering period coupled with a non-action (e.g., not picking up an item) may indicate that, although the display is attractive to the shoppers, the product is not interesting or is priced improperly.

Such actions can help determine the effectiveness of a display by comparing the number of shoppers who pass by and ignore the display (e.g., no linger time, did not touch an item, but walked up to the display) to the number of shoppers attracted to the display (e.g., a linger time greater than a few seconds and touched an item). In addition, these statistics can be compared to overall sales, based on POS data, for example, and a count of the overall number of shoppers entering the store. Detecting and counting specific shopper behaviors as they occur at specific locations, and comparing similar events across otherwise disparate sites, effectively "normalizes" the events by removing site-specific differences and focuses on actions that are directly attributable to the interactions of the shoppers with the products.

Figure 11:
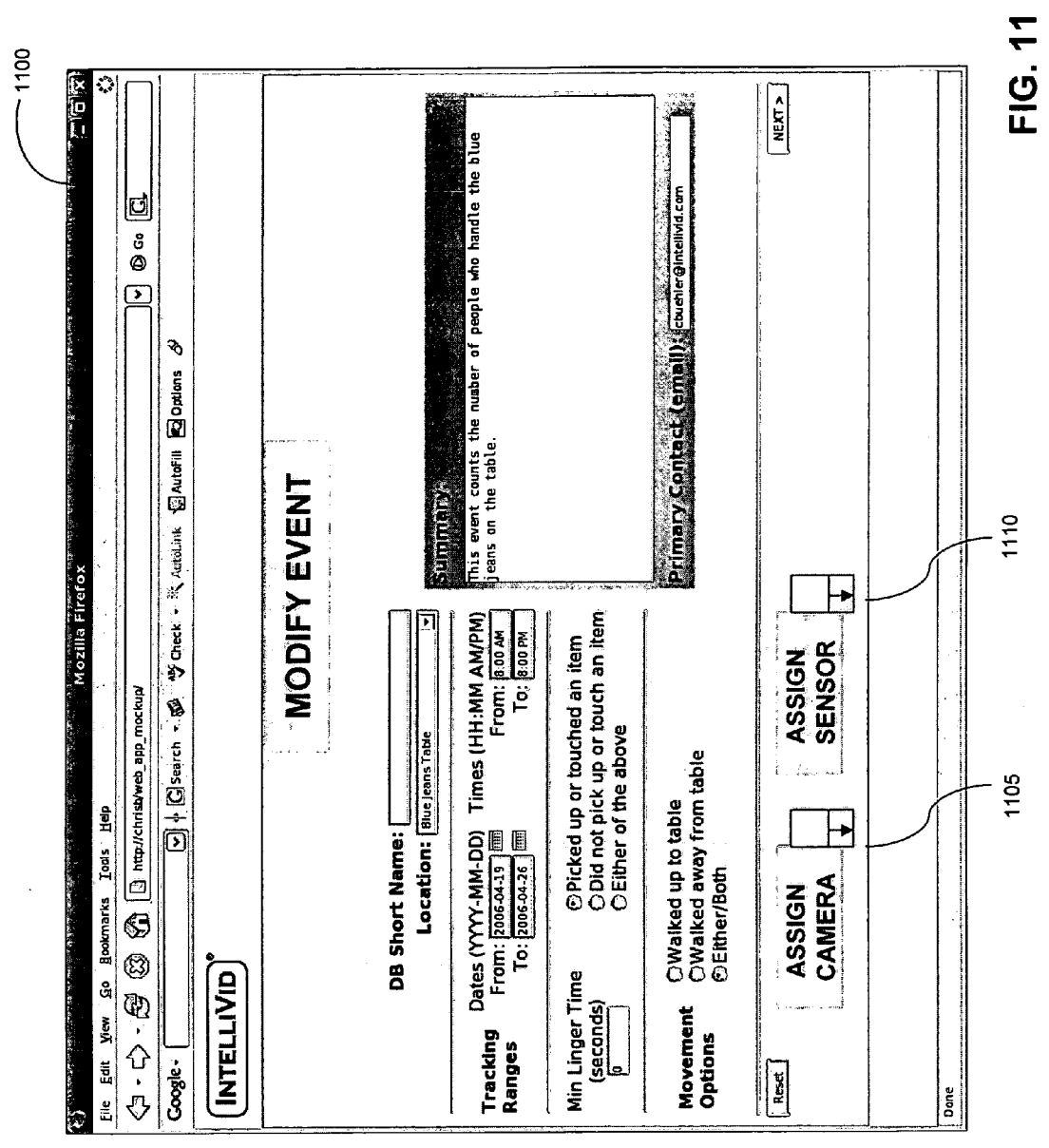

Referring to FIG. 11, an example of an application screen includes an event-editing user interface 1100 for modifying an event and assigning site-specific elements to the event. In some embodiments, data previously entered (by a central user, for example) and displayed on user interface 1100 to a remote user is read only, whereas in some cases certain elements may be read only (e.g., the name and time-based parameters) and other data elements are editable. In each case, the user interface 1100 also includes an assign-camera selection box 1105 and an assign-sensor selection box 1110. In instances where a remote user receives instructions to implement the event at their site (or group of sites), the user can select from the available camera and/or sensor identifiers at her particular site. Allowing remote users to review the events and select the appropriate sensors for detecting the event improves the chances that the correct camera, for example, will record the event.

Figure 12:
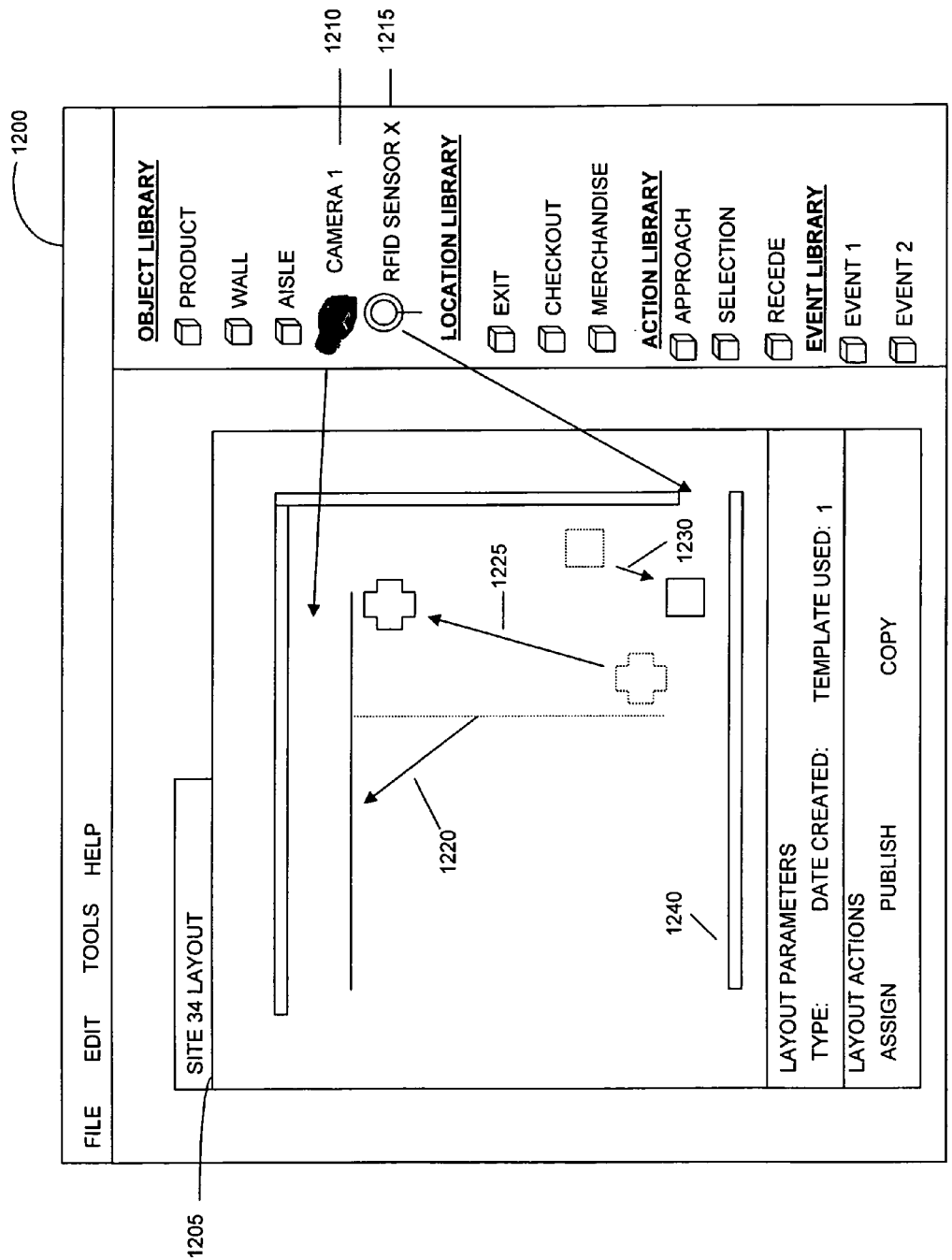
FIG. 12 is representation of a user interface for attributing site-specific components to events within a surveillance system according to one embodiment of the invention.

Referring to FIG. 12, an example of an application screen includes a template editing user interface 1200 for allowing remote users to customize a store floor-plan template provided by a central user. In addition to the functionality and features of the template design user interface 800, the template editing user interface 1200 allows users (either central or remote) to modify the templates such that they better describe a particular site. The object library can include the various video cameras 1210 and sensors 1215 (identified by unique ID in some cases) that can be selected and positioned at various locations about the floor-plan. For example, a user may know that a particular camera is affixed to a particular wall and is directed at an aisle, and will therefore place the camera at that location. Similarly, an RFID sensor or other similar EAS device may be placed at the store exit. In some instances, the template may include elements added by the central user (walls, aisles, displays, etc.) that are present at the remote sites, but not properly positioned. In such cases, the remote user can select the elements and alter their positioning about the site floor-plan. For example, an aisle 1220 that was positioned perpendicular to a particular wall in the original template can be moved such that it is now parallel to the wall. Likewise, merchandise display 1220 can be moved such that it remains at the end of the newly placed aisle. Point-of-sale location 1430 (e.g., a checkout counter) can also be moved to its proper location based on the actual floor-plan of the site. In some cases, additional elements, such as an additional wall 1440, can be added to complete the floor-plan. Once the site-specific changes to the floor-plan have been completed, the floor-plan is saved (either to remote storage, central storage, or both) and used as the basis for monitoring the sites. In some cases, the changes are submitted back to a central user for approval prior to implementation and/or use as future templates.

Referring to FIG. 13, an example of an application screen includes a floor plan-mapping user interface 1300 for mapping elements of a canonical floor-plan to an actual floor-plan at a remote site. Similar to the template editing user interface 1200, the floor plan-mapping user interface 1300 allows users to build site-specific floor-plans for implementation within the surveillance system described above; however, it provides a visual representation of both the template 805 an existing site floor-plan 1305, thereby allowing the user to annotate and manipulate the site floor-plan 1305 using the template. In some embodiments, an electronic representation of the floor-plan for a remote site may be available from another source, such as architectural drawings, building layouts, design drawings, and the like, and the user may wish to use the drawings as a starting point for the site-specific floor-plan. For example, the user can indicate on the site floor-plan 1305 the location of video cameras and/or sensors 1310 and select items from the template 805 and indicate their true position on the site floor-plan 1305. Specifically, elements such as aisles 1315, POS devices 1320, and merchandise displays 1325 can be selected on the template 805, dragged onto the site floor-plan 1305 and placed at the correct location. In some instances, elements can be added to the floor-plan 1305, such as the entry 1330. In some cases, the system requires the user to "place" all the items from the template 805 on the site floor-plan 1305 prior to allowing the user to implement it for use in monitoring the site. As a result, a complete and accurate site floor-plan is made available to the system for use in detecting events of interest at the site, without requiring central users to have intimate knowledge of each remote site, but assures that some minimal number of events are implemented at each site.

In addition to mapping canonical floor-plan elements to the actual floor-plan, actual floor-plan elements can be mapped to canonical floor-plan elements, thus indicating to a central user the elements of the canonical floor-plan to which certain events are assigned. Such an approach further facilitates site-to-site comparisons using a normalized, standard floor-plan, but using data that is captured based on site-specific parameters. For example, to compare traffic totals among numerous (e.g., more than two) stores having different actual floor-plans, event data can be plotted against the canonical floor-plan. As a result, central users can identify the occurrence of events or products with exceptionally high shrinkage rates across multiple sites without having to first consider the different site floor-plans.

For embodiments in which the methods are provided as one or more software programs, the program may be written in any one of a number of high level languages such as FORTRAN, PASCAL, JAVA, C, C++, C#, BASIC, various scripting languages, and/or HTML. Data can be transmitted among the various application and storage modules using client/server techniques such as ODBC and direct data access, as well as via web services, XML and AJAX technologies. Additionally, the software can be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a hard disk, an optical disk, a magnetic tape, a PROM, an EPROM, EEPROM, field-programmable gate array, or CD-ROM.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for monitoring sites, the method comprising:
providing a canonical site layout specifying at least one common element located at a plurality of sites, each site having an actual site layout;
creating an annotated canonical site layout by assigning one or more events to one or more of the common elements without regard to the actual site layout;
facilitating modification of the annotated layout to conform it to each of the actual site layouts; and
monitoring each site in accordance with its corresponding modified annotated layout.

2. The method of claim 1 wherein the at least one element comprises a location at or within each of the plurality of sites.

3. The method of claim 1 wherein the events each comprise a site-independent component and a site-specific component.

4. The method of claim 3 wherein the site-independent component specifies an interaction between a person and the at least one element.

5. The method of claim 3 wherein the site-specific component comprises sensor identification data.

6. The method of claim 5 wherein the sensor identification data comprises one or more of video surveillance camera IDs, RFID sensor IDs, electronic article surveillance sensor IDs and proximity card sensor IDs.

7. The method of claim 1 wherein the monitoring step comprises generating alerts upon the occurrence of an event.

8. The method of claim 7 further comprising receiving at least one alert from at least one of the sites.

9. The method of claim 8 further comprising analyzing the at least one alert.

10. The method of claim 1 further comprising providing a downloadable applet to the at least one user to facilitate the processing of the modifications to the annotated canonical layout.

11. The method of claim 10 wherein the downloadable applet comprises an asynchronous JavaScript applet.

12. The method of claim 11 wherein the applet communicates with a remote data source using XML.

13. The method of claim 1 wherein the modifications comprise one or more of deleting an element of the annotated canonical site layout, changing a location associated with an element of the annotated canonical site layout, and adding an element to the annotated canonical site layout.

14. A system for monitoring sites, the system comprising:
a user interface comprising:
- a site-layout template pane for displaying a canonical site layout that comprises at least one site-independent element; and
- a site-specific pane for displaying an actual site layout of a monitored site; and a modification module for facilitating association of at least one site-independent element with a site-specific element of the actual site layout.

15. The system of claim 14 wherein the modification module comprises an asynchronous java script applet.

16. The system of claim 14 further comprising a web server for providing the applet to users and for processing data requests from the applet.

17. The system of claim 16 further comprising a data-storage module in communication with the web server for fulfilling data requests submitted to the web server via the modification module.

18. A system for monitoring sites, the method comprising:
- means for providing a canonical site layout specifying at least one common element located at a plurality of sites, each site having an actual site layout;
- means for creating an annotated canonical site layout by assigning one or more events to one or more of the common elements without regard to the actual site layout;
- means for facilitating modification of the annotated layout to conform it to each of the actual site layouts; and
- means for monitoring each site in accordance with its corresponding modified annotated layout.

* * * * *